United States Patent
Sevindik et al.

(10) Patent No.: US 12,207,331 B2
(45) Date of Patent: *Jan. 21, 2025

(54) METHODS AND APPARATUS FOR UTILIZING DUAL RADIO ACCESS TECHNOLOGIES IN WIRELESS SYSTEMS

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,106

(22) Filed: Jan. 30, 2023

(65) Prior Publication Data

US 2023/0180322 A1 Jun. 8, 2023

Related U.S. Application Data

(63) Continuation of application No. 17/111,425, filed on Dec. 3, 2020, now Pat. No. 11,570,833.

(51) Int. Cl.
*H04W 76/15* (2018.01)
*H04L 5/14* (2006.01)
(Continued)

(52) U.S. Cl.
CPC .............. *H04W 76/15* (2018.02); *H04L 5/14* (2013.01); *H04W 36/00692* (2023.05);
(Continued)

(58) Field of Classification Search
CPC . H04W 76/15; H04W 36/0069; H04W 76/27; H04W 88/06; H04W 36/00692;
(Continued)

(56) References Cited

U.S. PATENT DOCUMENTS 6,542,730 B1 4/2003 Hosain
6,542,739 B1 4/2003 Garner
(Continued)

FOREIGN PATENT DOCUMENTS

CN 105071860 A 11/2015
JP 2006325206 A 11/2006
(Continued)

OTHER PUBLICATIONS

3GPP TS 38.212 V.15.10.0 3rd Generation Partnership Project; Technical Specification Group Radio Access Network; NR; Multiplexing and Channel Coding (Release 15), Sep. 2020.
(Continued)

*Primary Examiner* — Huy C Ho
(74) *Attorney, Agent, or Firm* — Patent Beach PC

(57) ABSTRACT

Methods and apparatus for operation of a dual-connectivity enabled premises device in a wireless communication network. In one embodiment, the methods and apparatus utilize so-called "quasi-licensed" CBRS (Citizens Broadband Radio Service) wireless spectrum in conjunction with a cellular wireless communication network (e.g. having 4G/4.5G LTE and 5G NR base stations) for the provision of services to a number of installed enhanced fixed wireless apparatus (FWAe) at user or subscriber premises. The FWAe has dual-connectivity functionality, and can connect to two different access technologies simultaneously. The FWAe (and base stations) also support a "split" mode of operation wherein each air interface is selectively used for only certain types of traffic (e.g., UL or DL only).

20 Claims, 28 Drawing Sheets

(51) Int. Cl.
  *H04W 36/00* (2009.01)
  *H04W 76/27* (2018.01)
  *H04W 88/06* (2009.01)

(52) U.S. Cl.
  CPC ............ *H04W 76/27* (2018.02); *H04W 88/06* (2013.01); *H04W 36/00698* (2023.05)

(58) Field of Classification Search
  CPC ... H04W 36/00698; H04L 5/14; H04L 5/1469
  USPC ......................................................... 370/329
  See application file for complete search history.

(56) References Cited

U.S. PATENT DOCUMENTS

| | | | |
|---|---|---|---|
| 8,880,071 | B2 | 11/2014 | Taaghol et al. |
| 9,948,349 | B2 | 4/2018 | Malach |
| 11,102,560 | B2 | 8/2021 | Hoole et al. |
| 11,190,861 | B2 | 11/2021 | Bali |
| 11,483,203 | B2 | 10/2022 | Sevindik et al. |
| 2006/0262770 | A1 | 11/2006 | Park et al. |
| 2008/0101291 | A1 | 5/2008 | Jiang et al. |
| 2013/0010686 | A1 | 1/2013 | Shatzkamer et al. |
| 2013/0077554 | A1 | 3/2013 | Gauvreau et al. |
| 2013/0156115 | A1 | 6/2013 | Petrovic |
| 2014/0269865 | A1 | 9/2014 | Aparin |
| 2016/0013855 | A1 | 1/2016 | Campos et al. |
| 2016/0021595 | A1 | 1/2016 | Czaja et al. |
| 2016/0073344 | A1 | 3/2016 | Vutukuri et al. |
| 2016/0094421 | A1 | 3/2016 | Bali et al. |
| 2016/0128072 | A1 | 5/2016 | Rajagopal et al. |
| 2016/0259923 | A1 | 9/2016 | Papa et al. |
| 2016/0294498 | A1 | 10/2016 | Ma et al. |
| 2017/0019144 | A1 | 1/2017 | Malach |
| 2017/0245281 | A1 | 8/2017 | Zuckerman et al. |
| 2018/0146408 | A1 | 5/2018 | Meylan et al. |
| 2018/0184337 | A1 | 6/2018 | Jin et al. |
| 2018/0213452 | A1 | 7/2018 | Kim et al. |
| 2018/0288657 | A1 | 10/2018 | Stojanovski et al. |
| 2018/0343685 | A1 | 11/2018 | Hart et al. |
| 2018/0351809 | A1* | 12/2018 | Meredith ............ H04L 43/0882 |
| 2019/0037630 | A1 | 1/2019 | Zhang et al. |
| 2019/0109643 | A1 | 4/2019 | Campos et al. |
| 2019/0124572 | A1 | 4/2019 | Park et al. |
| 2019/0124696 | A1 | 4/2019 | Islam et al. |
| 2019/0229974 | A1 | 7/2019 | Campos et al. |
| 2019/0319814 | A1 | 10/2019 | Das |
| 2019/0320322 | A1 | 10/2019 | Jayawardene et al. |
| 2019/0320494 | A1 | 10/2019 | Jayawardene et al. |
| 2019/0320498 | A1 | 10/2019 | Sadri et al. |
| 2019/0363866 | A1 | 11/2019 | Gaal et al. |
| 2019/0379455 | A1 | 12/2019 | Wang et al. |
| 2020/0037211 | A1* | 1/2020 | Hinc ................. H04W 36/0009 |
| 2020/0214065 | A1 | 7/2020 | Tomala et al. |
| 2021/0176665 | A1 | 6/2021 | Lan et al. |

FOREIGN PATENT DOCUMENTS

| | | |
|---|---|---|
| JP | 2009135880 A | 6/2009 |
| JP | 2011254495 A | 12/2011 |
| JP | 2017118483 A | 6/2017 |
| KR | 20160097917 A | 8/2016 |
| WO | WO-2004045125 A2 | 5/2004 |
| WO | WO-2015147707 A1 | 10/2015 |
| WO | WO-2017186294 A1 | 11/2017 |

OTHER PUBLICATIONS

5G-Implementation-Guidelines-NSA-Option-3-version 2.1.pdf (gsma.com).

Deering, S., et al., "Internet Protocol, Version 6 (IPv6) Specification," Internet Engineering Task Force (IETF) RFC 2460, Dec. 1998, 39 pages.

"Internet Protocol, DARPA Internet Program, Protocol Specification", IETF RCF 791, Sep. 1981, 50 pages.

Maamoun K. M. et al., "A Survey and a Novel Scheme for RoF-PON as FTTx Wireless Services," 2009 6th InternationalSymposium on High Capacity Optical Networks and EnablingTechnologies(HONET), IEEE, 2009, pp. 246-253.

Nokia 5G New Radio (NR): Physical Layer Overview and Performance, IEEE Communication Theory Workshop, 2018 by A. Ghosh, May 15, 2018, 38 pages.

* cited by examiner

| E-UTRA Operating Band | Uplink (UL) operating band BS receive UE transmit $F_{UL\_low} - F_{UL\_high}$ | | | Downlink (DL) operating band BS transmit UE receive $F_{DL\_low} - F_{DL\_high}$ | | | Duplex Mode |
|---|---|---|---|---|---|---|---|
| 2 | 1850 MHz | – | 1910 MHz | 1930 MHz | – | 1990 MHz | FDD |
| 4 | 1710 MHz | – | 1755 MHz | 2110 MHz | – | 2155 MHz | FDD |
| 5 | 824 MHz | – | 849 MHz | 869 MHz | – | 894 MHz | FDD |
| 7 | 2500 MHz | – | 2570 MHz | 2620 MHz | – | 2690 MHz | FDD |
| 10 | 1710 MHz | – | 1770 MHz | 2110 MHz | – | 2170 MHz | FDD |
| 12 | 699 MHz | – | 716 MHz | 729 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| 18 | 815 MHz | – | 830 MHz | 860 MHz | – | 875 MHz | FDD |
| 19 | 830 MHz | – | 845 MHz | 875 MHz | – | 890 MHz | FDD |
| 23 | 2000 MHz | – | 2020 MHz | 2180 MHz | – | 2200 MHz | FDD |
| 25 | 1850 MHz | – | 1915 MHz | 1930 MHz | – | 1995 MHz | FDD |
| 26 | 814 MHz | – | 849 MHz | 859 MHz | – | 894 MHz | FDD |
| 29 | N/A | | | 717 MHz | – | 728 MHz | FDD |
| 30 | 2305 MHz | – | 2315 MHz | 2350 MHz | – | 2360 MHz | FDD |
| 35 | 1850 MHz | – | 1910 MHz | 1850 MHz | – | 1910 MHz | TDD |
| 36 | 1930 MHz | – | 1990 MHz | 1930 MHz | – | 1990 MHz | TDD |
| 38 | 2570 MHz | – | 2620 MHz | 2570 MHz | – | 2620 MHz | TDD |
| 40 | 2300 MHz | – | 2400 MHz | 2300 MHz | – | 2400 MHz | TDD |
| 41 | 2496 MHz | – | 2690 MHz | 2496 MHz | – | 2690 MHz | TDD |
| 42 | 3400 MHz | – | 3600 MHz | 3400 MHz | – | 3600 MHz | TDD |
| 43 | 3600 MHz | – | 3800 MHz | 3600 MHz | – | 3800 MHz | TDD |
| 46 | 5150 MHz | – | 5925 MHz | 5150 MHz | – | 5925 MHz | TDD |
| 66 | 1710 MHz | – | 1780 MHz | 2110 MHz | – | 2200 MHz | FDD |
| 70 | 1695 MHz | – | 1710 MHz | 1995 MHz | – | 2020 MHz | FDD |

FIG. 5B (Prior art)

METHODS AND APPARATUS FOR UTILIZING DUAL RADIO ACCESS TECHNOLOGIES IN WIRELESS SYSTEMS

PRIORITY

This application is a continuation of, and claims priority to, co-owned and co-pending U.S. patent application Ser. No. 17/111,425 of the same title filed on Dec. 3, 2020, and issuing as U.S. Pat. No. 11,570,833 on Jan. 31, 2023, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary aspects, to methods and apparatus for operation utilizing dual radio access technologies, such as for example those providing connectivity via licensed, unlicensed or shared-access spectrum.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48), and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., 3GPP NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, wireless small cells, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc. See FIG. 1B, wherein multiple different CBSD/xNB devices 131 serving heterogeneous types of users/clients are backhauled to a common CMTS.

Another key component in the headend 102, is the Edge QAM modulator (EQAM) 105. The EQAM receives e.g., an IP unicast or multicast MPEG transport stream packet over a GigE (Gigabit Ethernet) interface, and produces transport stream on one or more RF channels for transmission over the HFC distribution network 121. The EQAM can also perform other functions such as re-stamp of Program Clock Reference (PCR) timestamps such as for de-jitter processing. Output from the EQAM 105 is combined with video signals (e.g., SDV, analog, etc.) for downstream transmission by the combiner logic 107.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider. Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 202, (ii) Priority Access tier 204, and (iii) General Authorized Access tier 206. See FIG. 2. The three tiers are coordinated through one or more dynamic Spectrum Access Systems (SAS) 302 as shown in FIG. 3 (including e.g., Band 48 therein).

Incumbent Access (existing DOD and satellite) users 202 include authorized federal and grandfathered Fixed Satellite Service (FSS) users currently operating in the 3.5 GHz band shown in FIG. 2. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 204 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 206 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels.

The FCC's three-tiered spectrum sharing architecture of FIG. 2 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 131 (see FIG. 3) can only operate under authority of a centralized Spectrum Access System (SAS) 302. Rules are optimized for small-cell use, but also accommodate point-to-point and point-to-multipoint, especially in rural areas.

Under the FCC system, the standard SAS 302 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 3, these functions are provided for by, inter alia, an incumbent detection (i.e., environmental sensing) function 307 configured to detect use by incumbents, and an incumbent information function 309 configured to inform the incumbent when use by another user occurs. An FCC database 311 is also provided, such as for PAL license validation, CBSD registration, and other functions.

An optional Domain Proxy (DP) 308 is also provided for in the FCC architecture. Each DP 308 includes: (1) SAS interface GW including security; (2) directive translation between CBSD 131 and domain commands; (3) bulk CBSD directive processing; and (4) interference contribution reporting to the SAS.

A domain is defined is any collection of CBSDs 131 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 308 can aggregate control information flows to other SAS, such as e.g., a Commercial SAS (CSAS, not shown), and generate performance reports, channel requests, heartbeats, etc.

CBSDs 131 can generally be categorized as either Category A or Category B. Category A CBSDs have an EIRP or Equivalent Isotropic Radiated Power of 30 dBm (1 Watt)/10 MHz, fixed indoor or outdoor location (with an antenna<6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 4 illustrates a typical prior art CBRS-based CPE (consumer premises equipment)/FWA architecture 400 for a served premises (e.g., user residence), wherein the CPE/FWA 403 is backhauled by a base station (e.g., eNB or gNB) 131, the latter which is backhauled by the DOCSIS network shown in FIG. 1A. A PoE (Power over Ethernet) injector system 404 is used to power the CPE/FWA 403 as well as provide Ethernet (packet connectivity for the CPE/FWA radio head to the home router 405).

Additionally, new wireless systems and small cells are being fielded, including in new frequency bands which may be licensed, unlicensed, or allocated under a shared model similar to that used for CBRS (see e.g., FIG. 5, illustrating new Band 71 with the 600 MHz region, and FIG. 6 showing e.g., Bands 12-17 in the 700 MHz region).

Dual Connectivity in Non-Standalone 5G Network

NG-RAN or "NextGen RAN (Radio Area Network)" is part of the 3GPP "5G" next generation radio system. 3GPP has specified Release 16 NG-RAN (and is currently working on Release 17), its components, and interactions among the involved nodes including so-called "gNBs" (next generation Node B's or eNBs). NG-RAN will provide high-bandwidth, low-latency wireless communication and efficiently utilizes, depending on application, various types of spectrum such as that described supra in a wide variety of deployment scenarios, including indoor "spot" use, urban "macro" (large cell) coverage, rural coverage, use in vehicles, and "smart" grids and structures. NG-RAN is also intended to integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core, also called "5GC").

The NG-RAN specifications define two deployment models: i) Non-Standalone (NSA) mode relies on an existing 4G Evolved Packet Core (EPC) network for control functions, while the 5G user plane is used for the data transmission; and ii) Standalone (SA) where 5G control and user planes are used for both signaling and data transmission.

3GPP is delivering Release 15 to industry in three distinct steps: (i) 'early' drop: contains Non-standalone 5G specifications (so called Option-3 family), ASN.1 frozen in March 2018; (ii) 'main' drop: contains Standalone 5G (so called Option-2), ASN.1 frozen in September 2018; and (iii) 'late' drop: contains additional migration architectures (so called Option-4, Option-7, and 5G-5G dual connectivity).

Additionally, at least first generation NR implementations ("early drop—Option 3" discussed above) require both 3GPP 4G and 5G capability to operate in tandem, as part of the non-standalone (NSA) configuration, which adds further requirements/complexity. Specifically, 3GPP Release 15 indicates that the first implementations of networks and devices will be classed as NSA, in effect meaning that 5G networks will be supported by existing 4G/4.5G core infrastructure. For instance, 5G-enabled UEs will connect using 5G frequencies for data-throughput improvements, but will continue use of 4G/4.5G infrastructure and EPC. That is, NSA leverages the existing LTE radio access and core to anchor 5G NR using the "Dual Connectivity" feature. Dual Connectivity may be defined as operation wherein a given UE consumes radio resources provided by at least two different network points (e.g. NR access from gNB and LTE access from eNB).

The initial implementations of 5G cellular infrastructure will be directed primarily to so-called enhanced mobile broadband (eMBB) and URLLC (ultra-reliable low latency communications). These features are intended to provide, inter alia, increased data-bandwidth and connection reliability via two (2) new radio frequency ranges: (i) Frequency Range 1—this range overlaps and extends 4G/4.5G LTE frequencies, operating from 450 MHz to 6,000 MHz. Bands are numbered from 1 to 255 (commonly referred to as New Radio (NR) or sub-6 GHz); and (ii) Frequency Range 2—this range operates at a higher 24,250 MHz to 52,600 MHz, and uses bands numbered between 257 to 511.

The 5G Standalone (SA) network and device standard advantageously provides simplification and improved efficiency over NSA. This simplification will lower CAPEX/OPEX cost, and improve performance in data throughput up to the edge portions of the wireless infrastructure. Once the incipient SA standard (later "drops" discussed above) is implemented, migration from 5G NSA to SA by operators will occur according to any one of a number of possible migration paths; however, until such migration is completed, NSA requirements must be supported where applicable.

NSA allows dual connectivity with 4G and 5G radios, which allows devices (e.g., CPE 606) to send and receive data using 4G and 5G simultaneously to different 4G and 5G base stations. In a typical NSA "Option 3" architecture 600 shown in FIG. 6A, the 5G network is supported by exiting 4G infrastructure 603. As shown in FIG. 6A, in the prior art architecture 600, the 5G base station 605 (the "secondary" node) communicates to the EPC 603 via the LTE base station 607 ("master" node) via Xx-U and Xx-C user and control plane interfaces.

FIG. 6B illustrates a typical "Option 3a" architecture 620, wherein the 5G NR CBSD (gNB) interfaces directly with the EPC for UP (via S1-U interface), but no UP data is exchanged between the gNB and eNB. This means that a single data bearer cannot share load over LTE and NR. As one example, VoLTE voice UP traffic for a given user is transacted over LTE while Internet (IP) UP traffic is handled by the 5G base station.

FIG. 6B illustrates a typical "Option 3x" architecture 630, wherein the 5G NR CBSD (gNB) interfaces directly with the EPC for UP (via S1-U interface), and also UP data is exchanged between the gNB and eNB. It is in effect a combination of Option 3 and Option 3a architectures discussed above. This means that data bearers can be split over LTE and NR as needed.

In addition, in the extant architecture, transmission of DL data 636 and UL data 635 are multiplexed in time. In Time Division Multiplexing (TDD) mode (See FIG. 6D), a radio frame is divided into DL and UL sub-frames, hence the DL or UL cannot be transmitted simultaneously. For instance, during DL sub-frame transmission, DL data is sent from the base station to the CPE, and in UL sub frame transmission the CPE transmit data to the base station.

Due to the foregoing DL/UL TDD scheme, there is some inherent inefficiency (as compared to theoretical maximums which might otherwise be achievable) during operation, owing in part to the fact that UL transmissions on any given interface are necessarily punctuated with DL transmissions, and vice versa. For instance, in normal operation, while a UE/CPE is sending UL data, the NodeB (e.g., CBSD) buffers DL data until the CBSD switches from UL to DL sub-frames, which adds additional delay in data transmission.

Hence, to increase spectral efficiencies in networks with dual connectivity such as those using 3GPP NSA Option 3 configurations, improved apparatus and methods are needed. Such improved apparatus and methods would ideally support comparatively high levels of performance (e.g., data rates on both DL and UL) for devices with dual connectivity capability, without large capital expenditures (CAPEX) to deploy an SA network core or other infrastructure.

SUMMARY

The present disclosure addresses the foregoing needs by providing, inter alia, methods and apparatus, for inter alia, enhanced operation of a CPE such as a CBRS FWA device in dual connectivity radio mode.

In a first aspect of the disclosure, a computerized method of operating a wireless access device is described. In one embodiment, the method includes: causing establishment of a connection to a first base station; causing establishment of a connection to a second base station; enabling a split radio connectivity mode for the wireless access device; and using at least the split radio connectivity mode, transacting user plane (UP) data with each of the first and second base stations, the transacting UP data with the first base station comprising only receiving downlink (DL) user plane (UP) data from the first base station, and the transacting UP data with the second base station comprising only transmitting UP data to the second base station.

In one variant, the causing establishment of a connection to the first base station comprises causing establishment of an RRC connection to a 3GPP (Third Generation partnership Project) LTE (Long Term Evolution) enabled base station; and the causing establishment of a connection to the second base station comprises causing establishment of an RRC connection to a 3GPP 5G NR (Fifth Generation New Radio) enabled base station. The first base station and second base station are configured e.g., in an Option 3 configuration where both the first base station and second base station are backhauled to a common 3GPP evolved packet core (EPC).

In another variant, the causing establishment of a connection to the second base station comprises causing establishment of an RRC connection to a 3GPP (Third Generation partnership Project) LTE (Long Term Evolution) enabled base station; and the causing establishment of a connection to the first base station comprises causing establishment of an RRC connection to a 3GPP 5G NR (Fifth Generation New Radio) enabled base station.

In a further variant, the enabling a split radio connectivity mode for the wireless access device comprises operating each of first and second air interfaces of the wireless access device in a time division uniplex (TDU) mode wherein each time slot of a time division structure is allocated to a common traffic transmission or reception direction.

In yet another variant, the first base station and second base station each comprise a CBRS (Citizens Broadband Radio Service) CBSD (Citizens Broadband Service Device) compliant with 3GPP (Third Generation Partnership Project) protocols; the transacting the UP data with each of the first and second base stations comprises receiving or transmitting, respectively using a CBRS frequency within the band of 3.550 to 3.700 GHz inclusive, the CBRS frequency assigned to the respective CBSDs by a SAS (Spectrum Allocation System); and the wireless access device comprises a CBRS fixed wireless apparatus (FWA).

In one implementation thereof, the first and second CBSDs are disposed at a common physical location and backhauled by a common modem apparatus operated by a cable MSO (multiple systems operator) to a common 3GPP evolved packet core (EPC).

In another variant, the method further includes characterizing downlink and uplink traffic associated with the wireless access device; and the enabling the split radio connectivity mode for the wireless access device is based at least in part on data generated by said characterizing. In one implementation, the characterizing the downlink and uplink traffic associated with the wireless access device comprises characterizing prior to the establishment of one of the connections to the first or second base stations. In another implementation, the characterizing the downlink and uplink traffic associated with the wireless access device comprises characterizing after the establishment of both the connections to the first or second base stations.

In another aspect, a computerized premises apparatus for use in a wireless network is disclosed. In one embodiment, the apparatus includes: a first wireless interface; a second wireless interface utilizing an at least partly different wireless protocol than a protocol of the first wireless interface; processor apparatus in data communication with the first and second wireless interfaces; and storage apparatus in data communication with the processor apparatus, the storage apparatus comprising at least one computer program.

In one variant, the at least one computer program is configured to, when executed by the processor apparatus, cause the computerized premises apparatus to: engage in communication with a first base station within wireless range of the first wireless interface via utilization of a synchronization and authentication protocol; obtain first data from the first base station, the first data enabling establishment of a first wireless data connection between the computerized premises apparatus and the first base station; based at least on second data characterizing at least one aspect of data traffic of the computerized premises apparatus, engage in communication with a second base station via utilization of a synchronization and authentication protocol, the second base station within wireless range of the second wireless interface of the computerized premises apparatus; obtain third data from the second base station, the third data enabling establishment of a second wireless data connection between the computerized premises apparatus and the second base station; and based at least on the establishment of the first wireless data connection and the second wireless data connection, entering a split mode of operation wherein each of the first wireless data connection and the second wireless data connection are utilized for transacting user plane (UP) data in only one direction.

In one implementation, the computerized premises apparatus comprises a wireless backhaul for a plurality of user client devices, portions of the UP data associated with respective ones of a plurality of applications configured to execute on respective ones of the user client devices.

In another implementation, the at least one computer program if further configured to, when executed: utilize the first wireless connection to request a first resource grant to be issued to the first wireless interface by a spectrum allocation entity via the first base station; and utilize the second wireless connection to request a second resource grant to be issued to the second wireless interface by a spectrum allocation entity via the second base station.

In a further variant, each of the first and second wireless interfaces utilize a time division duplex (TDD) protocol for carrying UL and DL data when the computerized premises apparatus is not operating in the split mode of operation, and utilize a modified TDD protocol when the computerized premises apparatus is operating in the split mode of operation. In one configuration thereof, the modified TDD protocol comprises using all or substantially all of a plurality of time slots during each of a plurality of data frames to carry data in a single common direction.

In a further aspect, a computerized base station apparatus for use in a wireless network is disclosed. In one embodiment, the apparatus includes: a first wireless interface; a second wireless interface utilizing an at least partly different wireless protocol than a protocol of the first wireless interface; processor apparatus in data communication with the first and second wireless interfaces; and storage apparatus in data communication with the processor apparatus, the storage apparatus comprising at least one computer program.

In one variant, the at least one computer program is configured to, when executed by the processor apparatus, cause the computerized base station apparatus to: engage in communication with a premises wireless device within wireless range of the first wireless interface via utilization of a synchronization and authentication protocol; cause establishment of a first wireless data connection between the computerized premises apparatus and the computerized base station apparatus via the first wireless interface; engage in communication with the premises wireless device within wireless range of the second wireless interface via utilization of a synchronization and authentication protocol; cause establishment of a second wireless data connection between the computerized premises apparatus and the computerized base station apparatus via the second wireless interface; and based at least on data received from the computerized premises apparatus indicating a request for a split mode of operation, cause entry into the split mode of operation wherein each of the first wireless data connection and the second wireless data connection are utilized for transacting user plane (UP) data with the computerized premises device using a modified TDD (time division duplex) protocol.

In one implementation thereof, the modified TDD protocol comprises using all or substantially all of a plurality of time slots during each of a plurality of data frames to carry data in a single common direction.

In another implementation, the modified TDD protocol is configured to obviate both (i) switching of each of the first wireless interface and the second wireless interface between transmit and receive functionality, and (ii) packet data buffering necessitated by said switching.

In a further implementation, the at least one computer program is further configured to, when executed, cause the base station apparatus to obtain a temporary network identifier to assign to the computerized premises apparatus for use as part of the establishment of the first and second wireless data connections. In one configuration thereof, the at least one computer program is further configured to, when executed, cause the base station apparatus to correlate the obtained temporary network identifier to a second, long-term identifier specific to the computerized premises device.

In another variant, the computerized base station apparatus is configured to be backhauled to a serving data network via a single backhaul modem; and one of the first or second wireless interfaces comprises a 5G New Radio (NR) compliant mmWave interface having an array of antenna elements configured for mmWave band communication with at least the computerized premises device.

In a further aspect of the disclosure, a method of operating a CPE is disclosed. In one embodiment, the method includes: causing establishment a connection to a first base station; causing establishment of a connection to a second base station; measuring the DL/UL traffic of the devices connected to the CPE; based on the traffic load, entering a dual radio connectivity mode; and performing at least one of (i) receiving data form the first base station and transmitting data to the second base station, or (ii) receiving data from the second base station and transmitting data to the first base station.

In another variant, the entering the dual radio connectivity mode includes determining if the traffic load associated to the CPE exceeds a predefined threshold.

In one implementation, the CPE, the first and second base stations are each configured to operate in a CBRS (citizens broadband radio service) frequency band, and the first and second base stations include a 3GPP-compliant NodeB (NB) configured to operate in a CBRS frequency band; e.g., the first base station includes a 4G LTE eNodeB, and the second base station includes a 5G gNodeB.

In yet another aspect, a CPE with dual connectivity functionality is disclosed. In one embodiment, the dual-connectivity apparatus is configured to operate simultaneously as a 4G LTE CPE and 5G NR CPE, with different types of data for various end user client devices (e.g., UL vs. DL) data split across the two air interfaces.

In a further aspect, a network architecture is disclosed. In one embodiment, the architecture includes a plurality of 3GPP compliant CBSD devices and a plurality of dual-connectivity, split-mode enabled FWA each configured for data communication with both CBSDs. The FWA devices can request split-mode operation, wherein certain traffic is carried on one established connection to one CBSD, while other traffic is carried on the other connection.

In another aspect, a time-based data framing protocol is disclosed. In one embodiment, the protocol utilizes time slots generated or prescribed according to a TDD protocol, yet utilizes each slot (at least on a per-frame basis) for unidirectional data traffic.

In an additional aspect of the disclosure, computer readable apparatus is described. In one embodiment, the apparatus includes a storage medium configured to store one or more computer programs, such as on a fixed wireless receiver of a managed wireless network. In one embodiment, the apparatus includes a program memory or HDD or SSD and stores one or more computer programs supporting relaying of data from a serving base station and the recipient fixed wireless receiver via one or more other fixed wireless receivers.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

These and other aspects shall become apparent when considered in light of the disclosure provided herein.

BRIEF DESCRIPTION OF THE DRAWINGS

FIG. 5B is a tabular representation of various E-UTRA RF spectrum bands currently allocated.

FIGS. 1-5B and 7-14 ©Copyright 2019-2020 Charter Communications Operating, LLC. All rights reserved.

DETAILED DESCRIPTION

Figure 1:
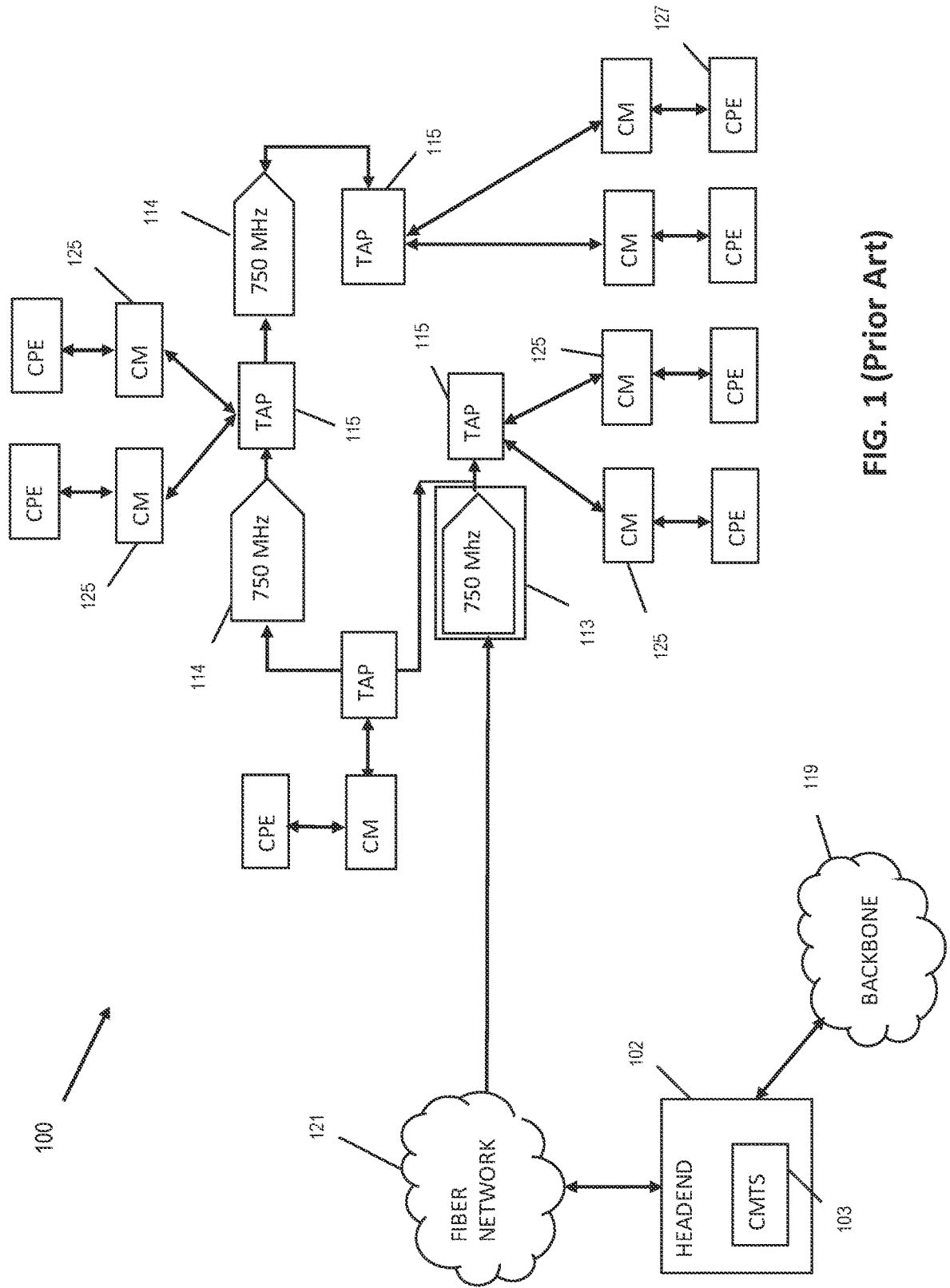
FIG. 1 is a block diagram illustrating a prior art hybrid fiber-coaxial (HFC) data network for delivery of data to end user devices.
Figure 1A:
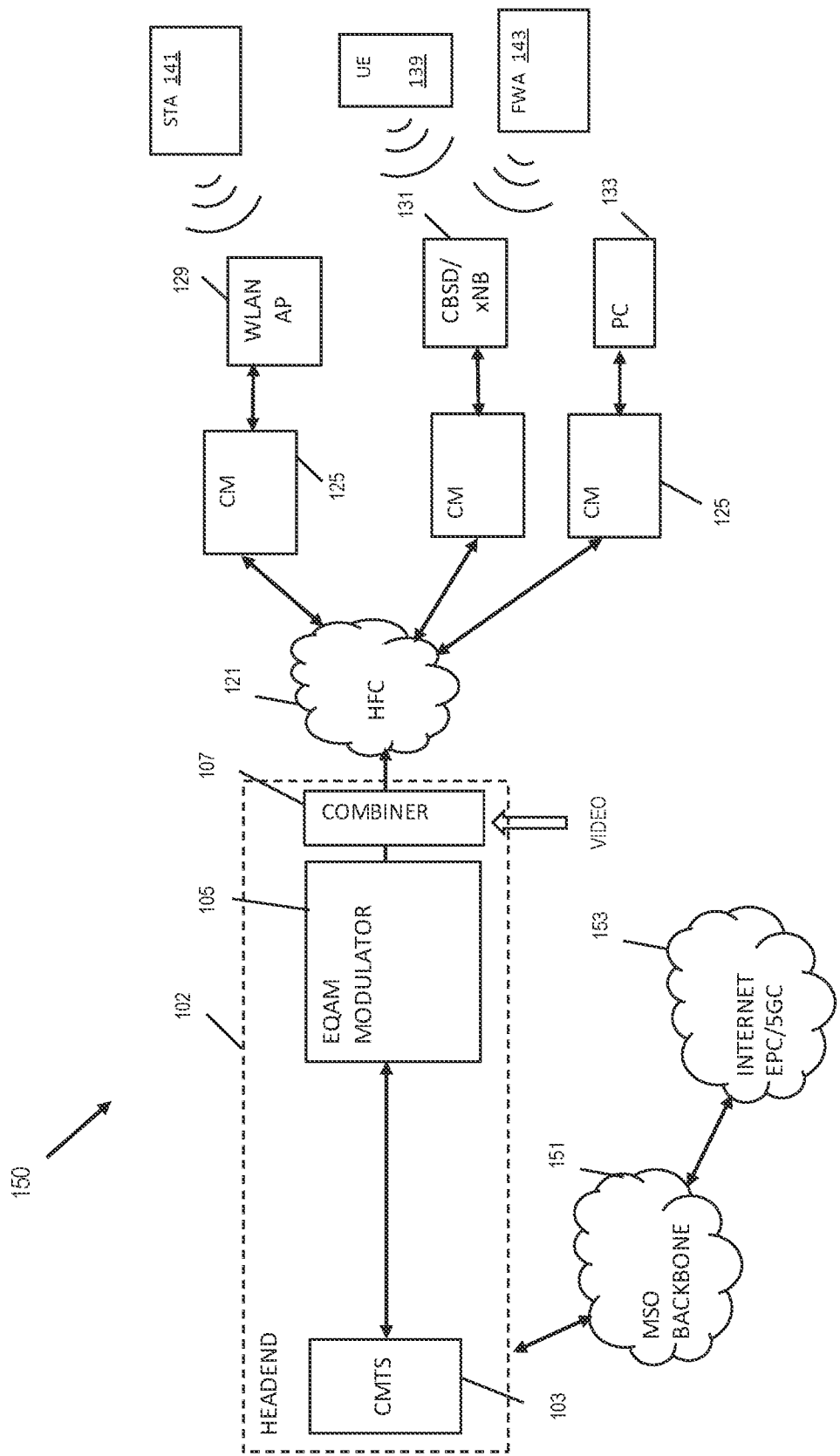
FIG. 1A is a block diagram illustrating the DOCSIS infrastructure of the HFC network of FIG. 1, and various types of backhauled premises devices.
Figure 1B:
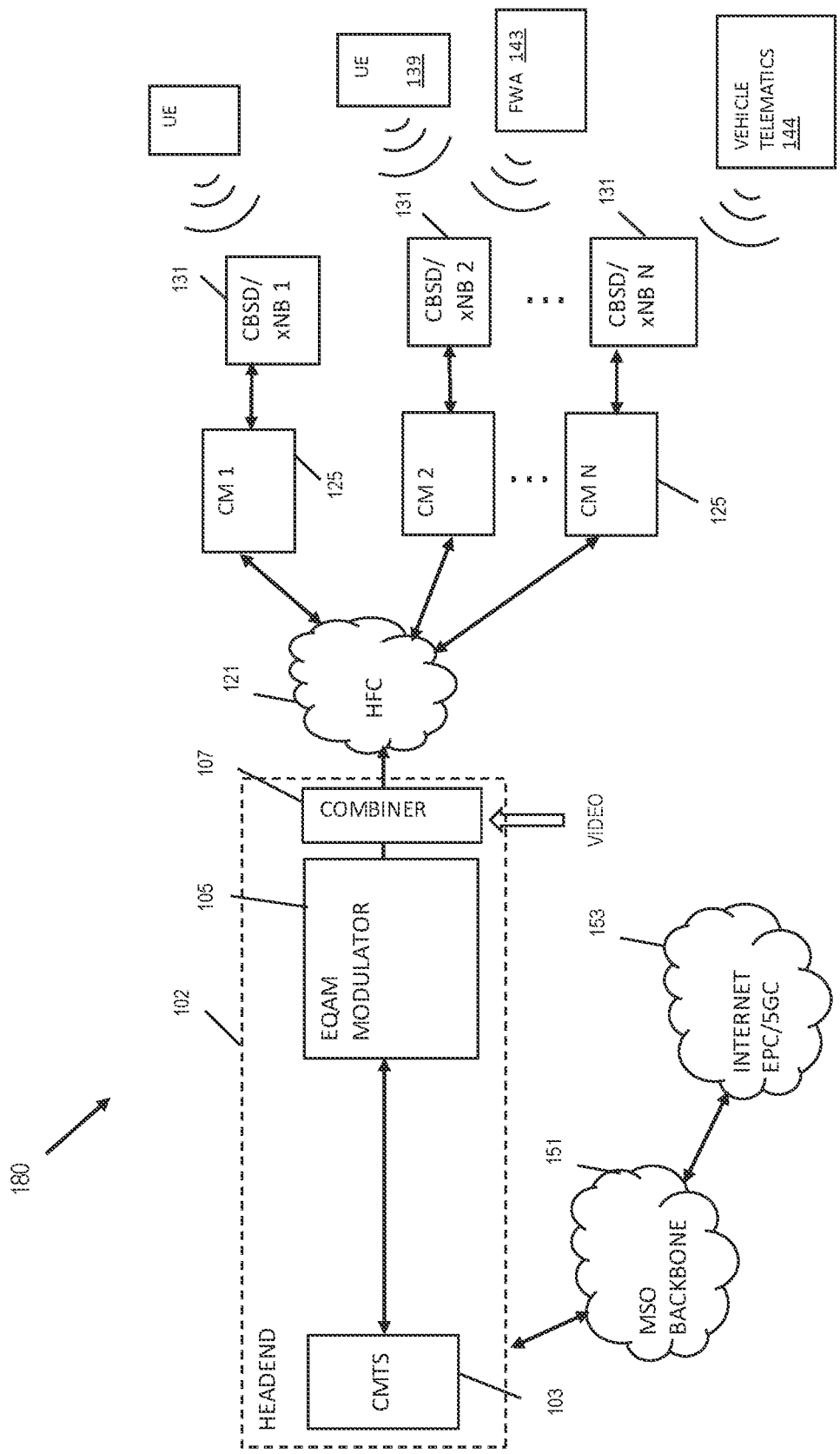
FIG. 1B is a block diagram illustrating the DOCSIS infrastructure of the HFC network of FIG. 1, wherein multiple different CBSD/xNB devices serving heterogeneous types of users/clients are backhauled to a common CMTS.
Figure 2:
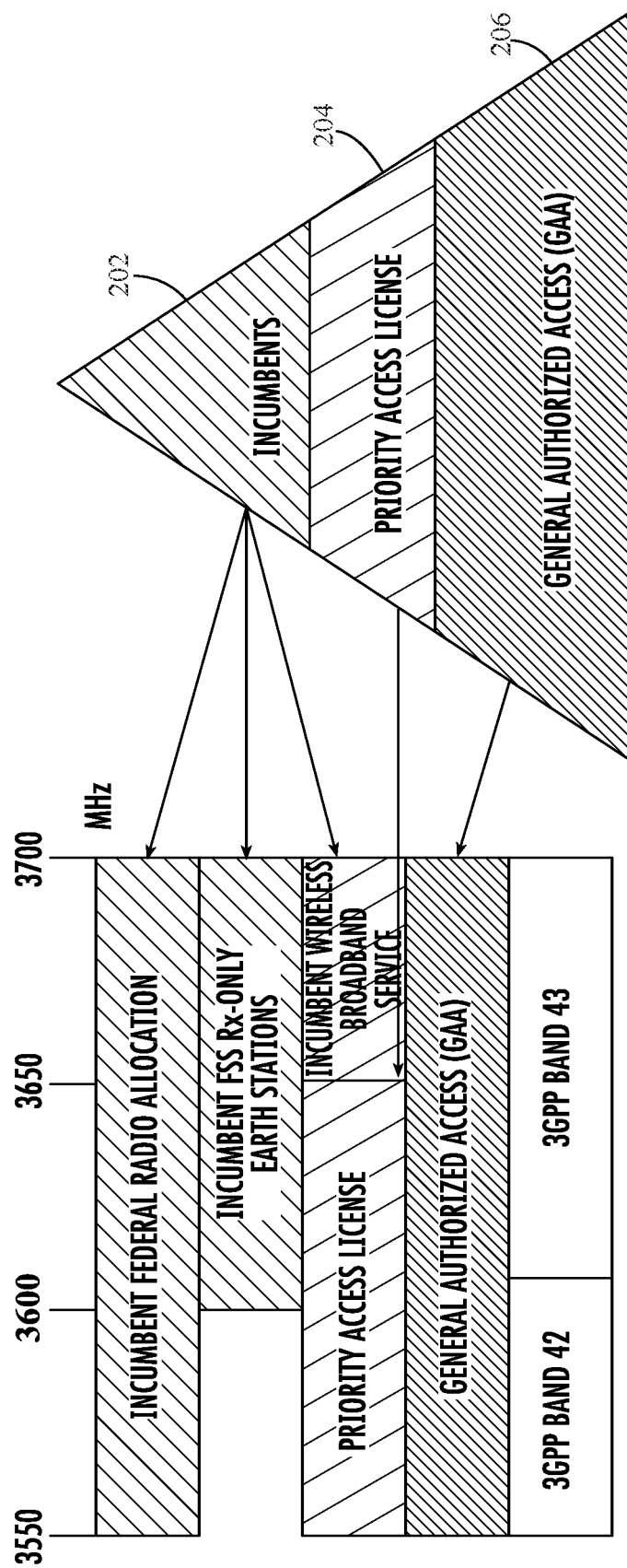
FIG. 2 is a graphical illustration of prior art CBRS (Citizens Broadband Radio Service) users and their relationship to allocated frequency spectrum in the 3.550 to 3.700 GHz band.
Figure 3:
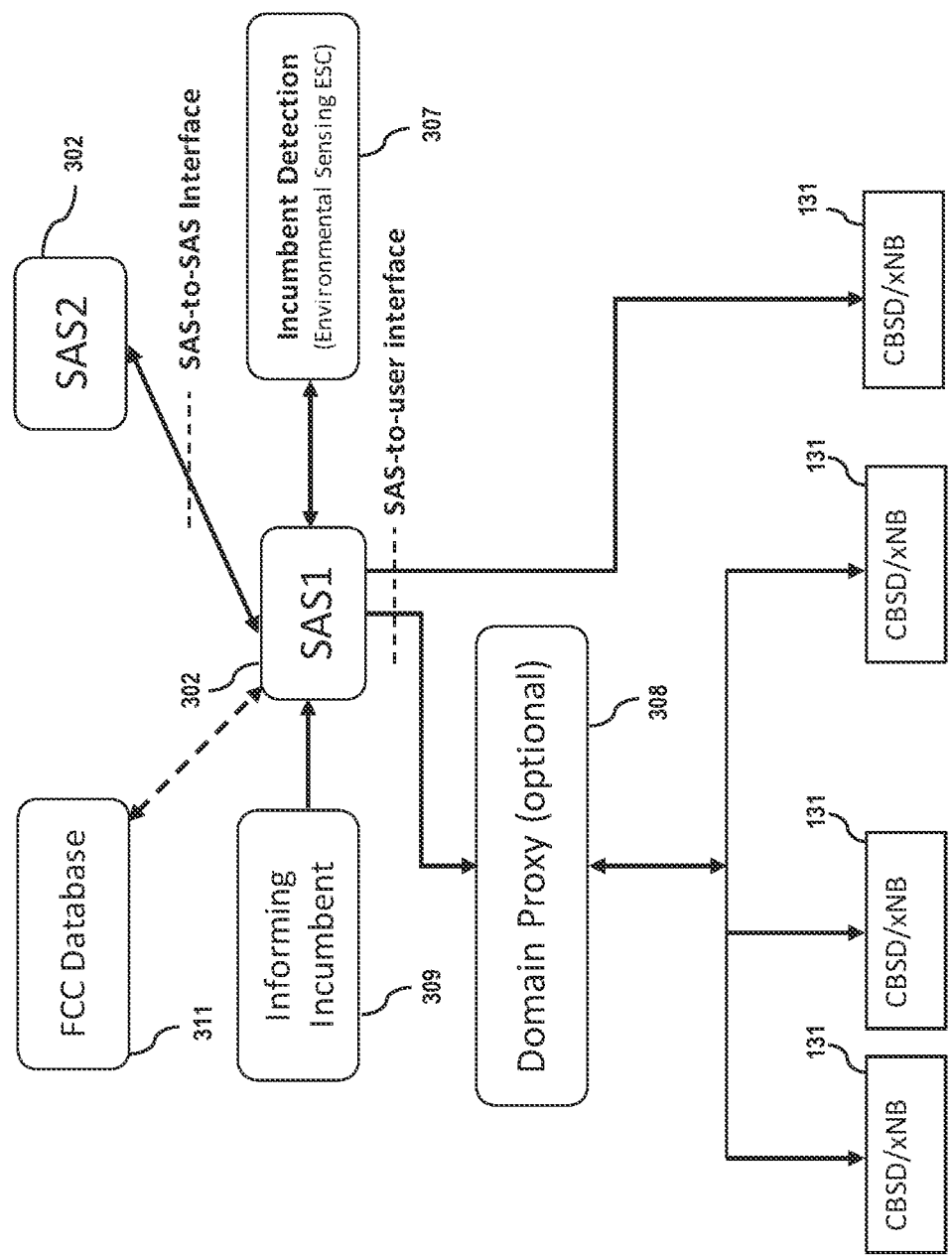
FIG. 3 is a functional block diagram illustrating a general architecture for the CBRS system of the prior art.
Figure 4:
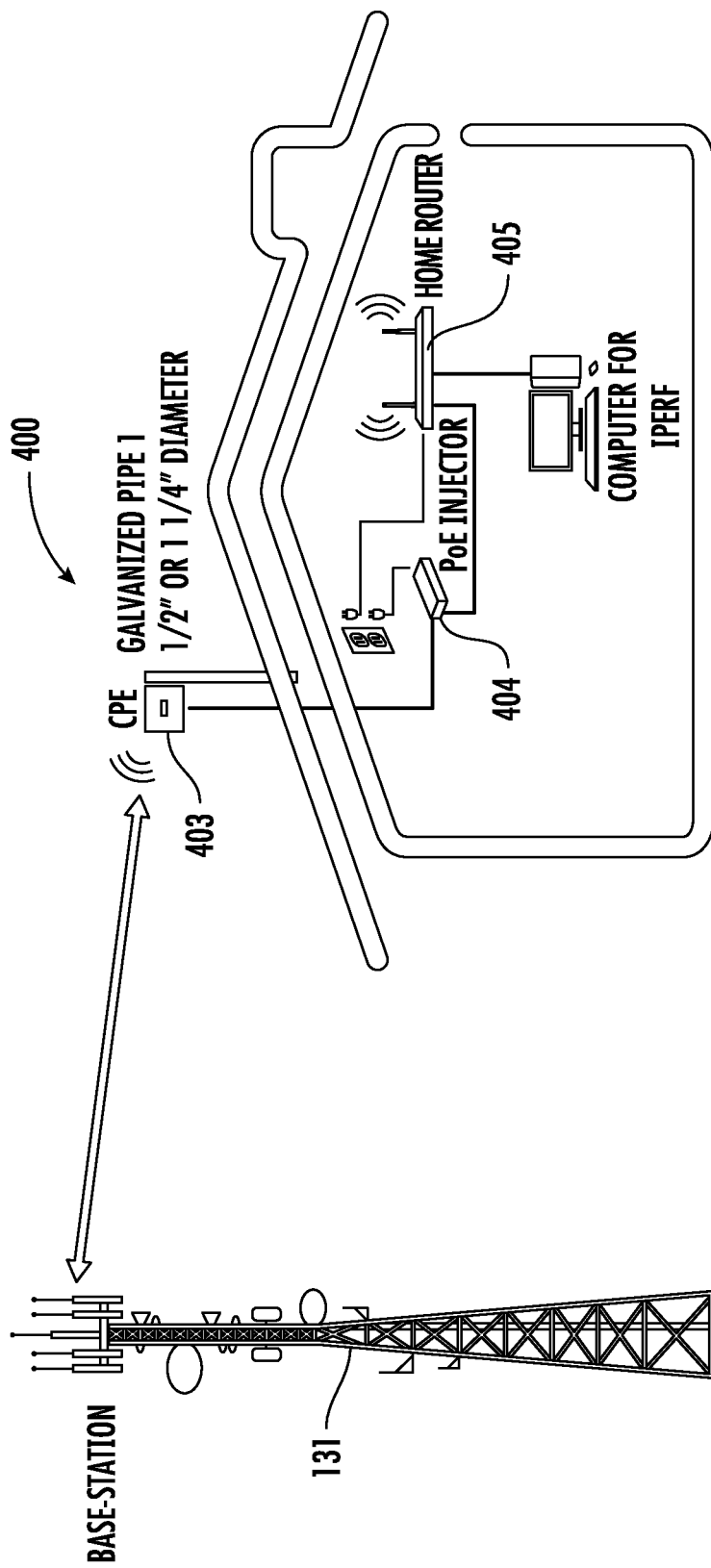
FIG. 4 is a graphical illustration of a prior art configuration for delivery of data from a base station to an end-user device (CPE/FWA) within the wireless coverage area of the base station.

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the terms "LTE" and "4G/4.5G" refer to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eU-TRAN) and gNBs (5G NR).

Overview

In one exemplary aspect, the present disclosure provides methods and apparatus for enhancing spectral efficiency and data rate for user devices (e.g., fixed consumer premises equipment such as CBRS FWA devices) with dual-connectivity capability that can connect to different access technologies.

In one embodiment, enhanced CPE/FWA (CPEe/FWAe) and correspond CBSDe/xNBe base stations are provided which are configured to utilize "quasi-licensed" spectrum provided under CBRS technology initiatives, via 3GPP-based infrastructure and protocols. The enhanced CPE/FWA each have dual radios, and hence are able to connect to 4G/4.5G LTE and 5G radio area networks of the corresponding 4G/5G xNBe devices simultaneously. Moreover, a "split" mode of operation is provided, wherein the normal TDD (time division duplex) framing structure of each air interface is modified such that each interface only carries one of DL or UL data for the given CPEe/FWAe, at least for a period of time. In that CPE/FWA devices typically backhaul a variety of user devices (e.g., via a WLAN), a fairly constant demand for both DL and UL traffic exists; this demand can be further leveraged through use of the dual-connectivity "split" modes of operation described herein.

This approach also advantageously allows for higher data rates and spectral efficiency than a CPE connected to a single network or CPE utilizing extant dual-connectivity protocols, due in part to obviation of TDD switching events (i.e., from DL to UL and back) for each radio, and associated buffering caused thereby. In effect, each air interface acts as a one-way data pipe for at least a prescribed period of time while the system is operating in split mode, and this architecture further allows for intelligent allocation of user plane (UP) traffic by the system based on e.g., traffic type, latency or QoS requirements, and the heterogeneous capabilities of the 4G/4.5 G and 5G interfaces and supporting infrastructure.

In one implementation, the CPEe/FWAe is connected commonly to commonly situated (integrated) CBSDe devices using an Option 3-based NSA (non-standalone) architecture. The commonly located CBSDe devices are backhauled by a network service provider (e.g., cable MSO) modem such as a DOC SIS modem for connection to the MSO core (and EPC). Use of the Option 3 NSA-based approach advantageously allows the MSO (and any federated or partnering MNOs) to leverage their extant LTE-based infrastructure while also providing enhanced user experience (via enhanced data rates in both DL and UL), as well as offering 5G UE support, and further enabling stepwise migration to an (ultimate) 5G NR-based solution.

In addition, the provision of enhanced spectral efficiencies in both uplink (UL) and downlink (DL) directions via dual connectivity, split-mode operation increases the network capacity without the need to install additional infrastructure such as CBSDs and associated backhaul, thereby effectively adding more customers to the network with a given CAPEX (capital expenditure).

The methods and apparatus described herein may also advantageously be extended to other shared-access architectures (i.e., other than CBRS) such as for example DSA, LSA, and TVWS systems, as well as other types of systems and spectrum.

Detailed Description of Exemplary Embodiments

Exemplary embodiments of the apparatus and methods of the present disclosure are described in detail. While these exemplary embodiments are described in the context of the previously mentioned base station (e.g., 3GPP eNB or gNB) wireless access points using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio/voice). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specifi-*

*cation*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

It will also be appreciated that while the primary embodiments of the methods and apparatus described herein are cast in terms of provision of service via co-located NodeB devices (e.g., 4G/4.5G and 5G CBSDe devices integrated within a common form factor and/or disposed at a common site), the various aspects of the disclosure are not so limited, and in fact contemplate implementations where the CBSDe devices are physically separated, backhauled by different optical or wireline or even wireless backhauls, and even operated by different operators.

Other features and advantages of the present disclosure will immediately be recognized by persons of ordinary skill in the art with reference to the attached drawings and detailed description of exemplary embodiments as given below.

Exemplary Network Architecture—

Figure 7:
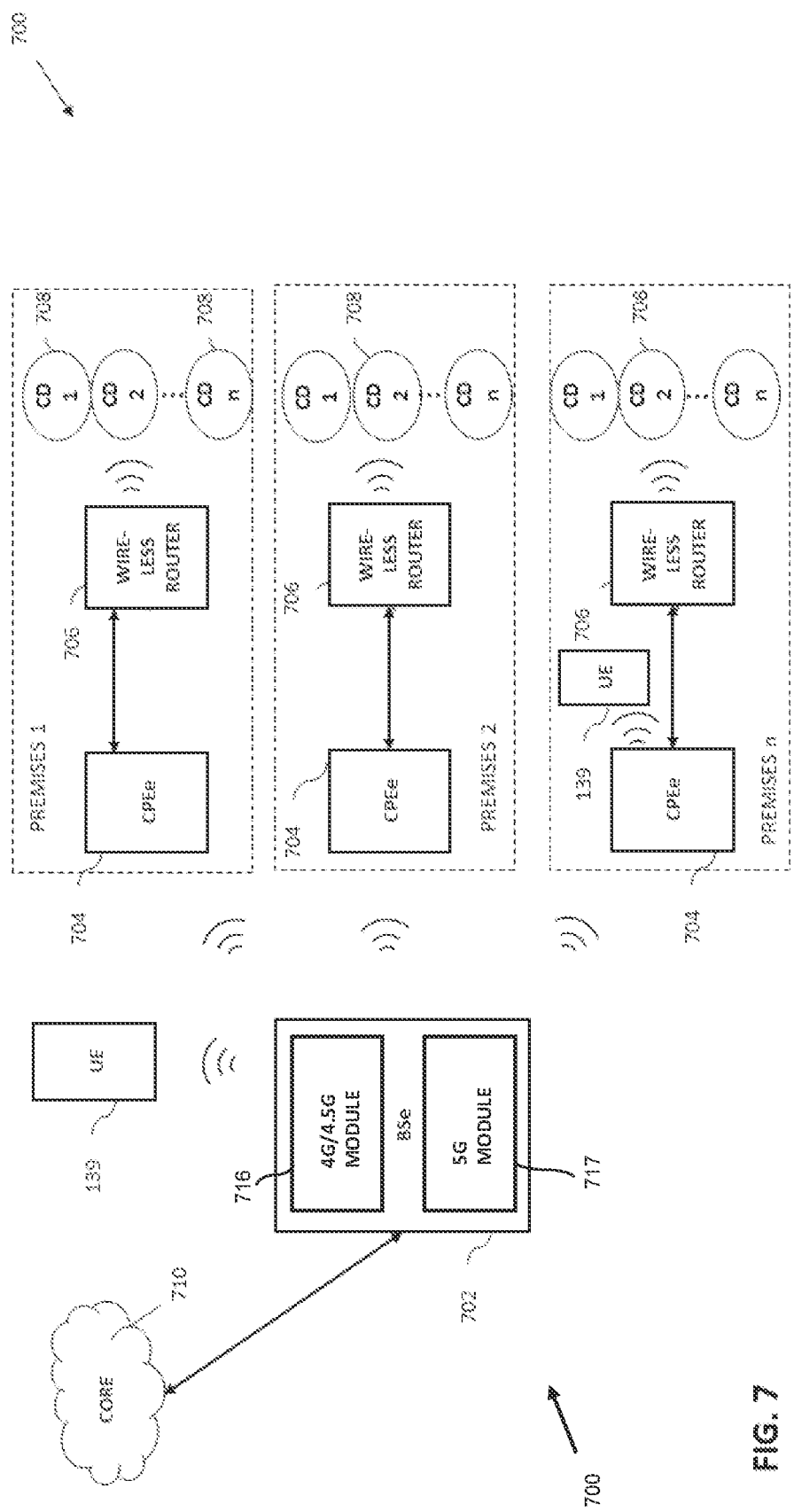
FIG. 7 is a block diagram an exemplary embodiment of one network architecture for transacting data to/from a 4G and 5G base stations and an enhanced CPE/FWA simultaneously, according to the present disclosure.

FIG. 7 is a block diagram illustrating a general network architecture configured for data traffic "splitting" and management during dual-connectivity mode, according to the present disclosure.

As illustrated, the exemplary network architecture 700 includes at least one enhanced base station or BSe 702 (e.g., CBSDe/xNBe with constituent 4G/4.5G CBSDe radio 716 and 5G CBSDe radio 717) connected to a core network 710, a plurality of dual-connectivity enabled CPEe 704 (e.g., FWAe devices), a plurality of respective wireless routers 706, and one or more client devices 708 connected to each wireless router 706. The CPEe may also support (backhaul) other devices such as DSTBs, modems, local small cells or access nodes, and IoT devices, not shown.

Figure 5A:
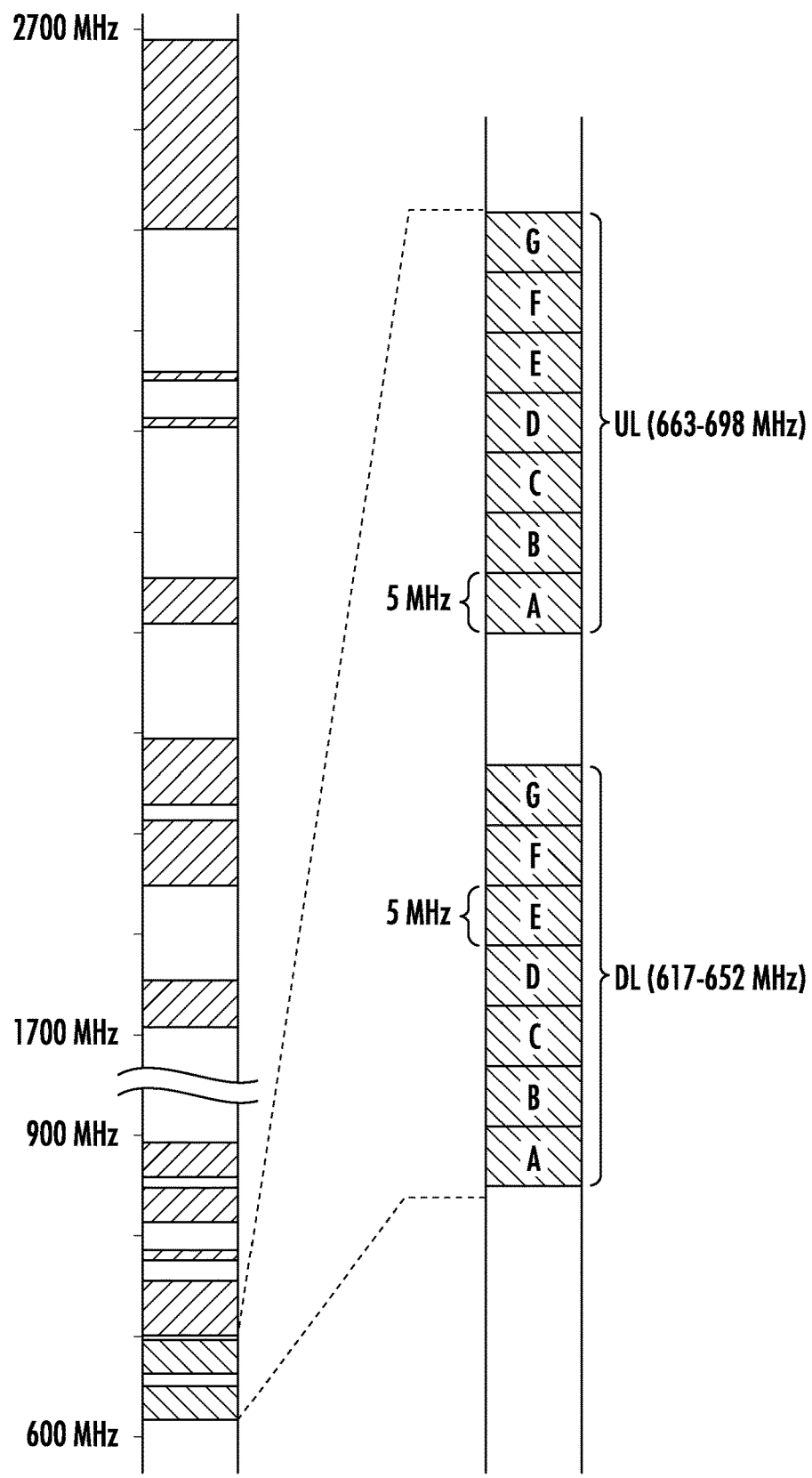
FIG. 5A is a graphical representation of Band 71 radio frequency (RF) spectrum currently allocated for use by the FCC.

In one exemplary embodiment, the individual radios 716, 717 of the BSe 702 are simultaneously connected wirelessly to each CPEe 704. For example, a radio access technology such as 3GPP 4G-LTE and 5G-NR can be used, in conjunction with the CBRS technology discussed elsewhere herein, to establish the wireless connections between the base station 702 and the CPEe 704. Moreover, as referenced herein, different spectrum (and types of spectrum) can be used consistent with the architecture 700, including e.g., ultra-high bandwidth mmWave as set forth in recent 3GPP 5G NR standards for the 5G NR radio 717, and/or licensed sub-1 GHz spectrum (see FIGS. 5A and 5B), with CBRS spectrum being merely exemplary.

Additionally, as previously referenced, while the embodiment of FIG. 7 illustrates a co-located (and physically integrated) form factor for the individual radios 716, 717, it will be appreciated that the constituent radios 716, 717 may be deployed as separate stand-alone devices, including at different physical locations, including separate backhauls if desired/required. This may be used for instance in cases where the path loss or other RF propagation factors for one band are significantly different or unequally affected from those of the other band, such as where the 4G CBSDe radio 716 uses a 3.550-3.700 GHz-band CBRS frequency, and the 5G NR radio 717 uses an unlicensed mmWave band, the latter which may require a more unimpeded of DLOS (direct line-of-sight) trajectory between itself and served FWAe 704 (e.g., one radio head 717 can be placed on the roof of a given MSO installation site, while the other 716 can be placed on the building's façade).

Further, the CU (central unit) and DU (distributed unit(s)) of the 5G radio 717 may be "split" according to Options 1-8 of the Release 15 et seq. standards, depending on desired functionality. For instance, a common CU may serve multiple BSe 702 within the MSO network, with each BSe having only the DU portion(s) of the gNB at the cell/base station site.

Returning to FIG. 7 as illustrated, the BSe 702 may also serve mobile UE 139, or other devices not shown directly (versus service at a served premises by the CPEe or associated small cell, as shown in the diagram of Premises N in FIG. 7).

Figure 9:
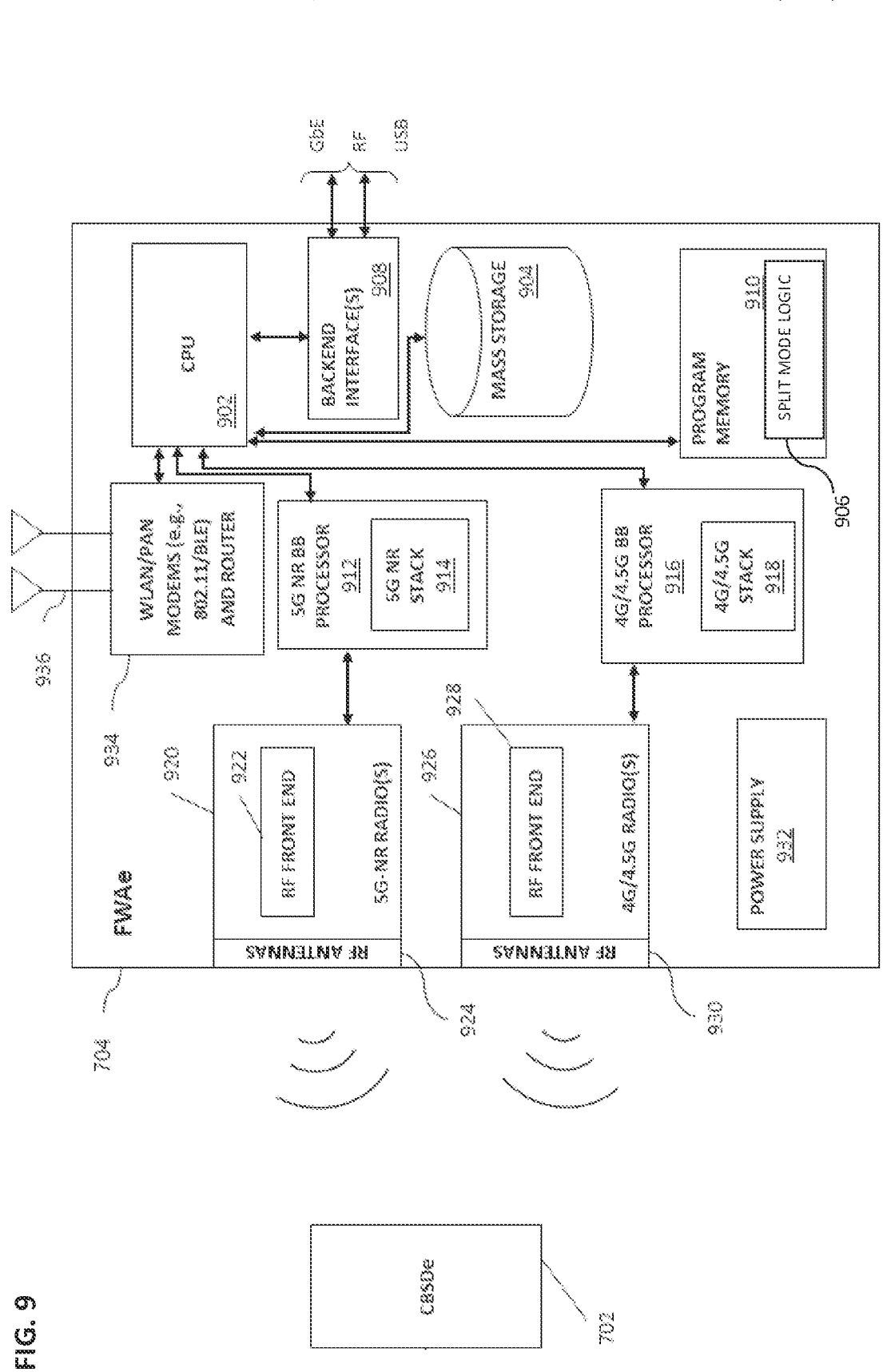
FIG. 9 is a block diagram illustrating an exemplary embodiment of a dual-connectivity-enabled FWAe apparatus according to the present disclosure.

Each CPEe 704 is connected in the illustrated embodiment via cable such as a CAT-5 cable to a wireless router 706 to provide a local area network (WLAN) service for the connected devices 708. It may also be integrated within e.g., the CPEe 704 as shown in the embodiment of FIG. 9, discussed infra. A connected device 708 can be any device that can connect to the wireless router 706 (e.g., via Wi-Fi connection), to consume any type of data that can be transmitted through it. Examples of the connected devices 708 include but are not limited to a smartphone, tablet, a personal computer (including a laptop), a smart television, or USB-based "stick" appliance. As discussed elsewhere herein, the connected devices 708 can consume various different types of data traffic generated for, e.g., web browsing, VoIP calling, video streaming, etc., including simultaneously based on different applications operative on the client.

In one embodiment, the network components of the architecture 700 are managed by a common network operator (e.g., cable MSO), with the core network 710 comprising a 3GPP EPC serving core functions for a plurality of BSe 702 distributed throughout an operating area. As previously described, using the so-called "Option 3 drop" configurations, operators such as MSOs can migrate to ultimate use of a 5GC by first installing gNBs which can leverage existing EPC and eNB infrastructure.

The individual served premises of FIG. 7 may be within urban, suburban, or rural areas in varying densities, such as within an MDU (e.g., apartment building), enterprise campus, or distributed throughout broader areas.

Moreover, while one CPEe 704 is shown serving each premises, the various premises can be aggregated or "ganged" together such that one CPEe serves multiple premises users, such as where a single CPEe serves an apartment building or college dorm, with each individual user account having its own wireless router 706 and other premises client devices with all being backhauled by a single CPEe. This may be the case in e.g., mmWave based installations which have extremely high bandwidth and backhaul capability for the constituent 5G NR air interface.

Dual Connectivity/Split-Mode Operation—

Figure 7A:
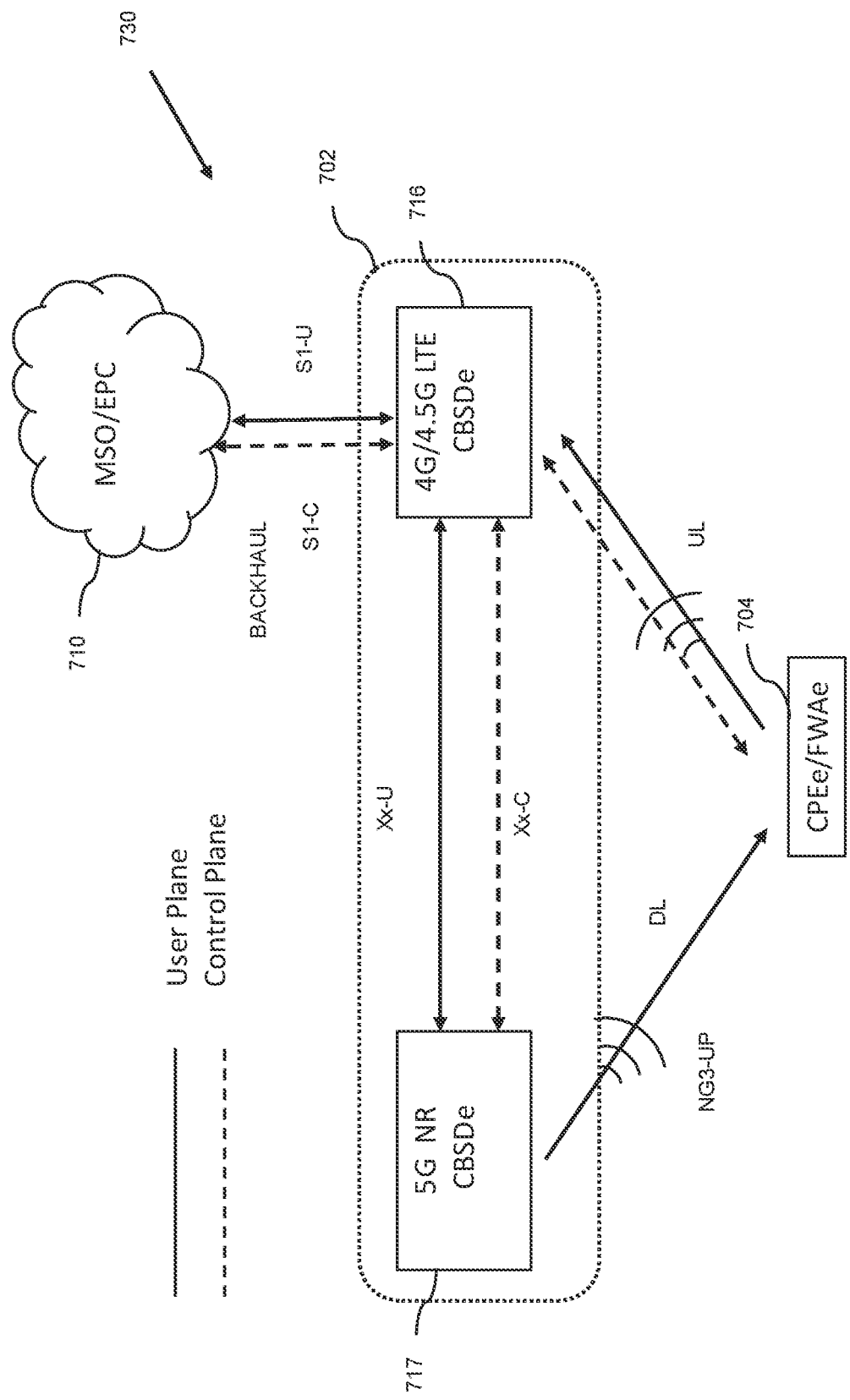
FIG. 7A is a block diagram an exemplary implementation of the network architecture of FIG. 7, wherein a 3GPP "Option 3" configuration is used.

FIG. 7A is a block diagram an exemplary implementation of the network architecture of FIG. 7, wherein a 3GPP "Option 3" configuration is used. In this configuration, the 5G NR CBSDe 717 provides UP data DL, and the 4G/4.5G CBSDe 716 is used for UL of UP data from the FWAe. The two CBSDe devices are communicative via UP and CP Xx interfaces. It is noted that CP data in this embodiment continues to flow bi-directionally as needed in contrast to the UP data.

Figure 7B:
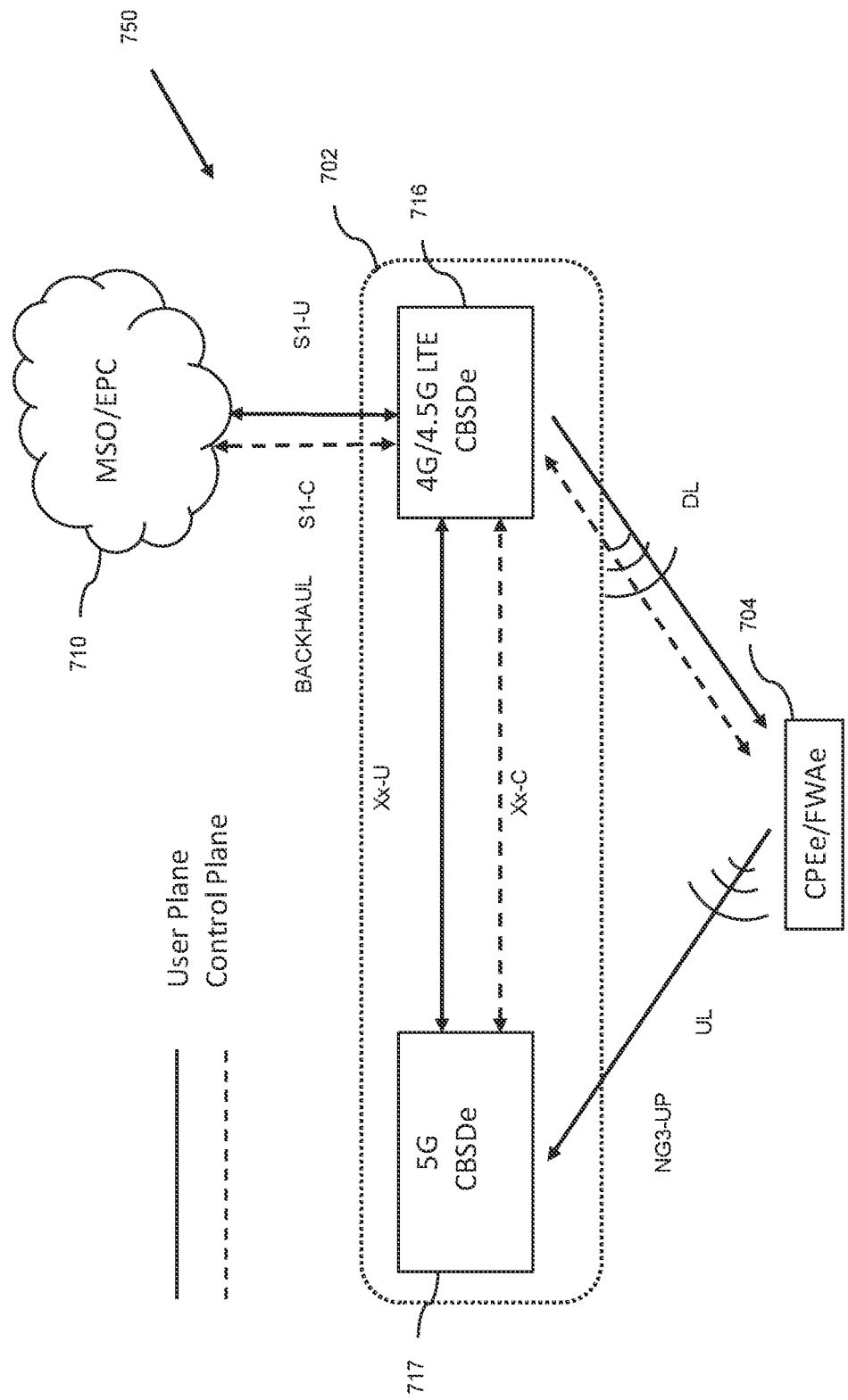
FIG. 7B is a block diagram another exemplary implementation of the network architecture of FIG. 7, wherein a 3GPP "Option 3" configuration is used.

FIG. 7B is a block diagram another exemplary implementation of the network architecture of FIG. 7, wherein a 3GPP "Option 3" configuration is used. In this configuration, the 5G NR CBSDe 717 provides UP data UL, and the 4G/4.5G CBSDe 716 is used for DL of UP data to the FWAe.

Figure 7C:
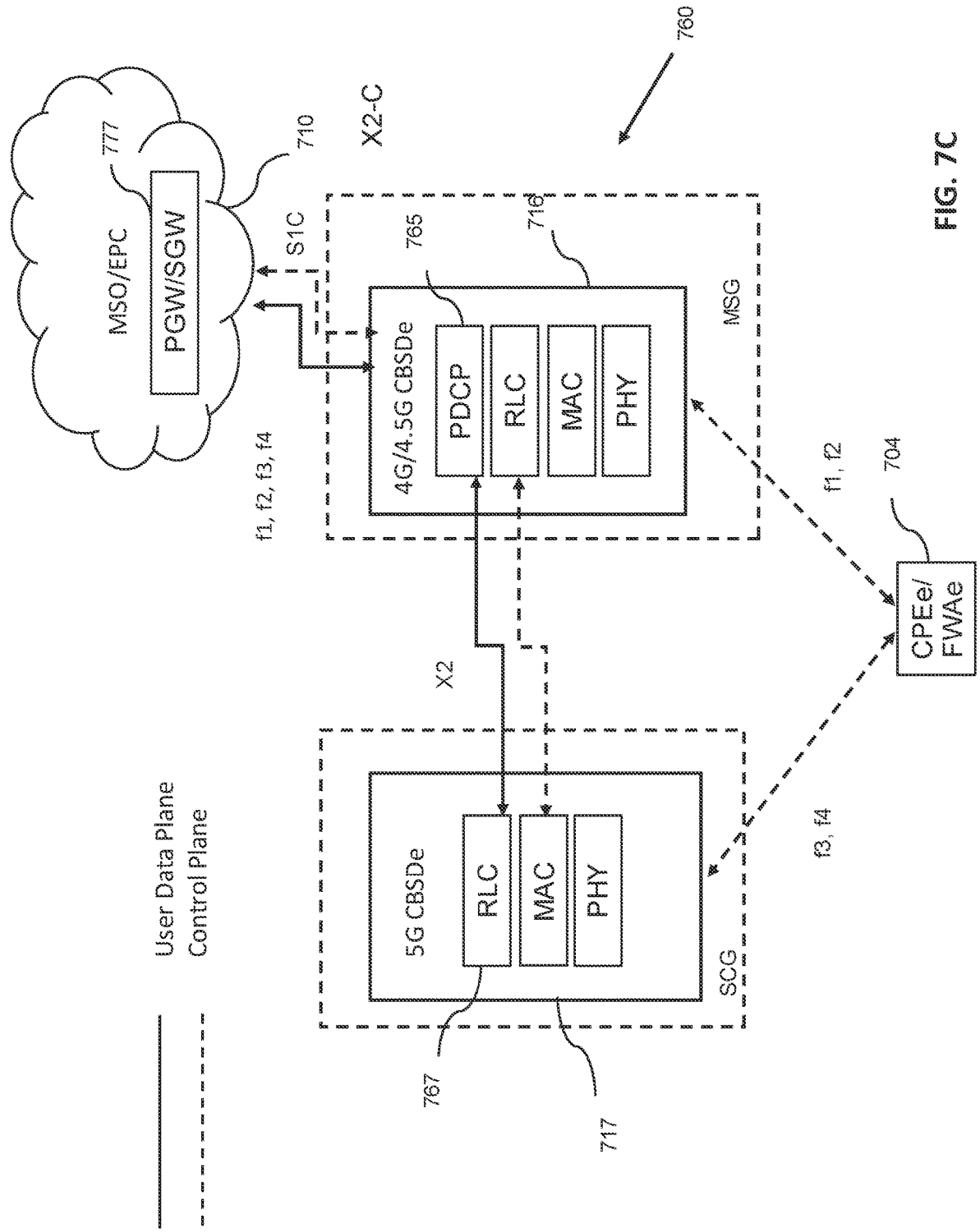
FIG. 7C is a block diagram illustrating exemplary protocol stack processes of the respective 5G NR and 4G/4.5G CBSDe apparatus of FIGS. 7-7B.

FIG. 7C is a block diagram illustrating exemplary protocol stack processes of the respective 5G NR and 4G/4.5G CBSDe apparatus of FIGS. 7-7B. As shown in the configuration 760, the 4G/4.5 base station is configured as a Master Cell Group (MSG), and the 5G base station is configured as a Secondary Cell Group (SCG), where the MSG is connected to EPC. The data traffic from/to the EPC is in one embodiment split at the PDCP layer of the 4G/4.5G CBSDe 716 via a split bearer. A default bearer supports the communication between the CPEe 704 and 4G/4.5G CBSDe and another default bearer supports the communication between the CPEe and the 5G CBSDe 717. Additionally, each of the MSG and SCG utilizes different set of aggregated carriers for carrying data traffic. In some embodiments, the 4G CBSDe 716 is configured to cover a macro-cell, while the 5G CBSDe is configured to cover a femto-cell.

For instance, as shown in FIG. 7C, carriers $f_1$ and $f_2$ are allocated to the MSG, and carriers $f_3$ and $f_4$ are allocated to the SCG. The user plane data coming from the PGW/SGW (packet gateway/serving gateway) 777 of the EPC 710, is split at the PDCP 765 of the MSG. The split bearer is routed through the SCG. Further, both bearers are divided at the MAC layer into components carriers. The control and user signaling between the 4G CBSDe 716 and 5G LTE CBSDe 717 is performed via the X2 interface, while the control and user plane signaling between MSG and PGW/SGW are performed via the S1 interface.

It is appreciated that the CPEe 704 can transmit and receive data on multiple carriers to/from the 4G CBSDe and 5G CBSDe using different set of antennas, where one antenna (array) is configured to propagate electromagnetic wave in 4G frequency range, while the other antenna (array) is configured to propagate electromagnetic wave in 5G (e.g., mmWave) frequency ranges. Additionally, the CPEe can feedback separate Channel State Information (CSI) and HARQ ACK/NCK to the 5G and 4G CBSDes, respectively. A scheduling algorithm manages the allocation of sub-frames to the CPEe in UL/DL, as described in greater detail below.

Figure 6A:
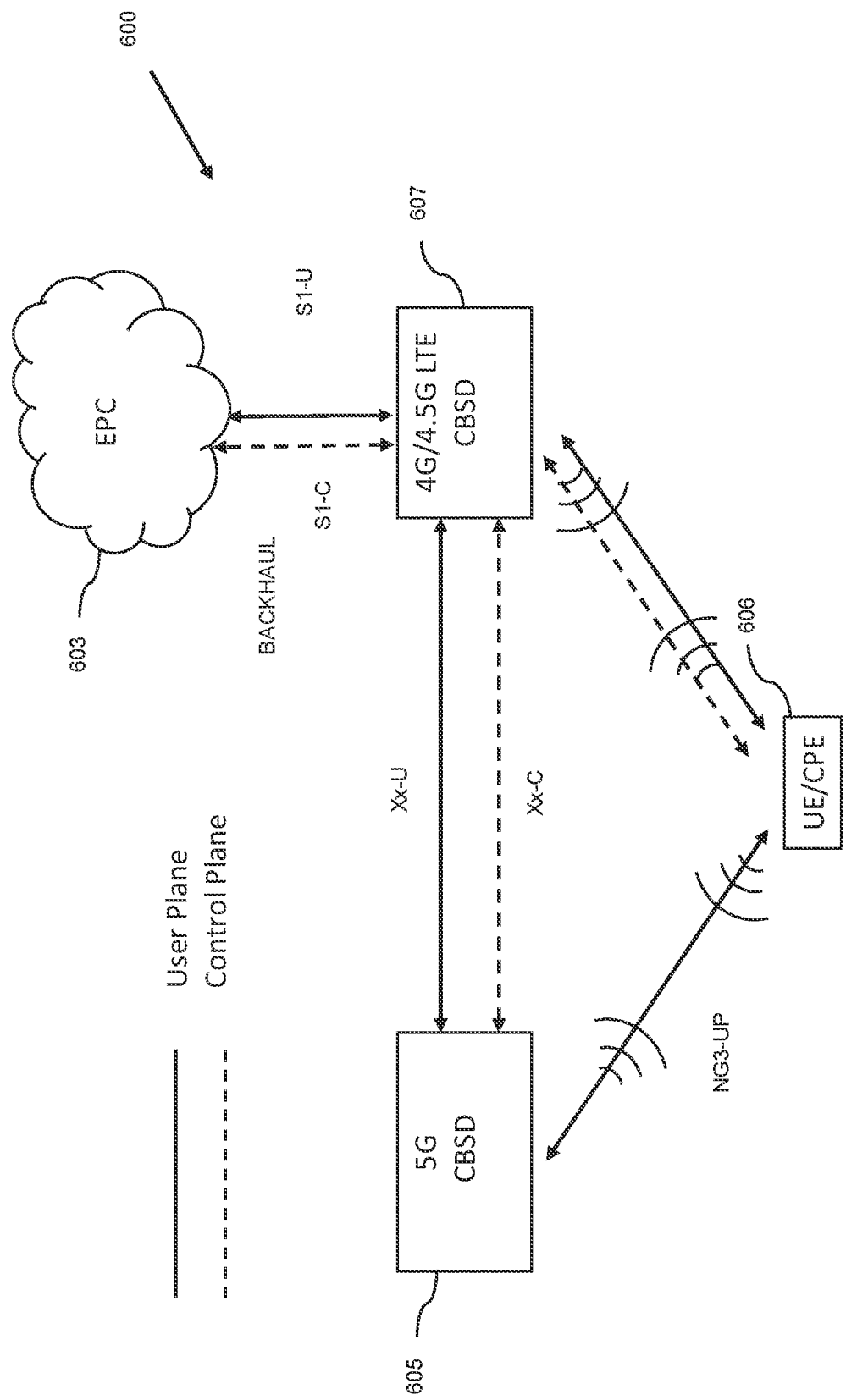
FIG. 6A is a block diagram showing a typical prior art 3GPP NSA Option 3 network configuration.
Figure 6B:
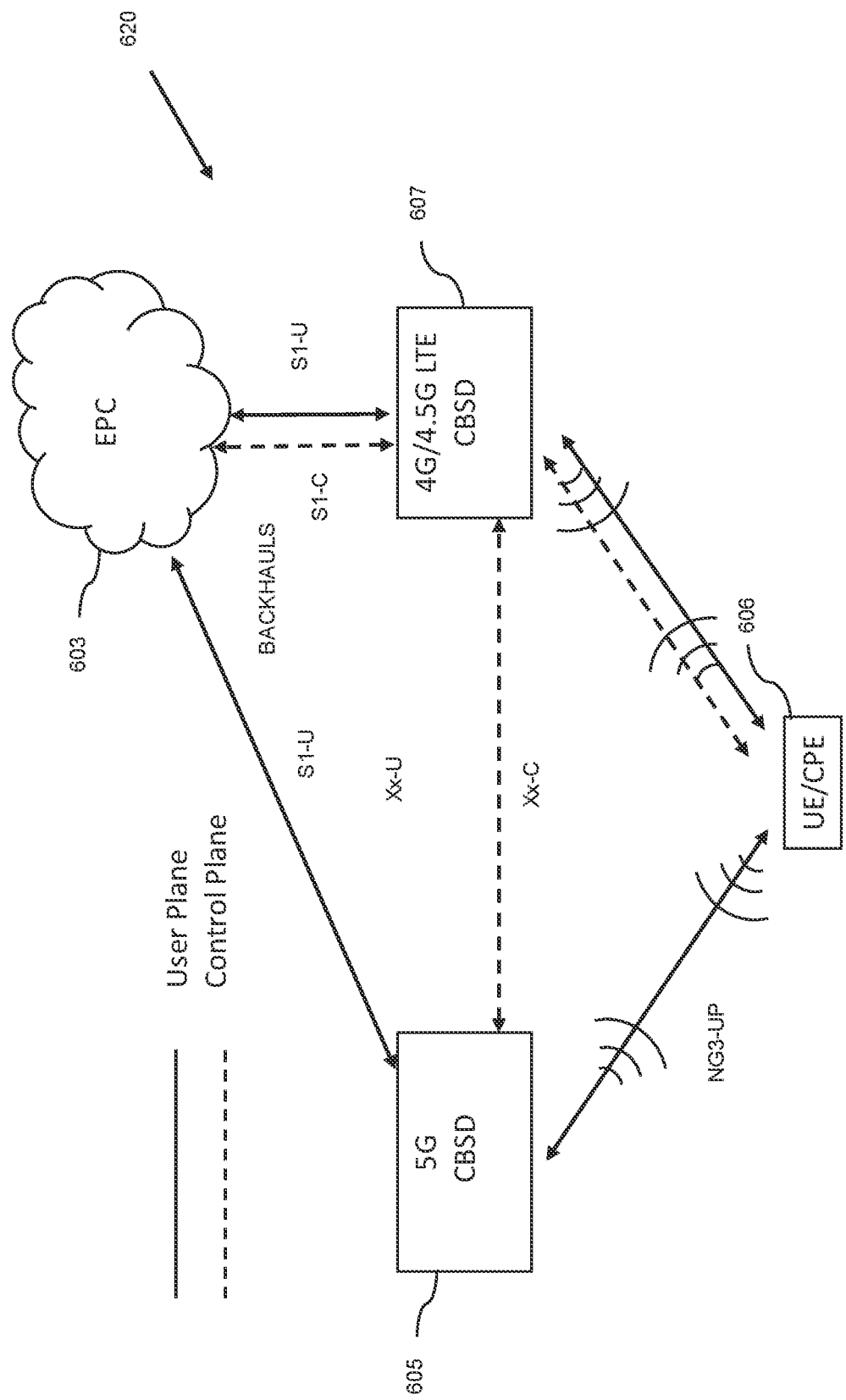
FIG. 6B is a block diagram showing a typical prior art 3GPP NSA Option 3a network configuration.
Figure 6C:
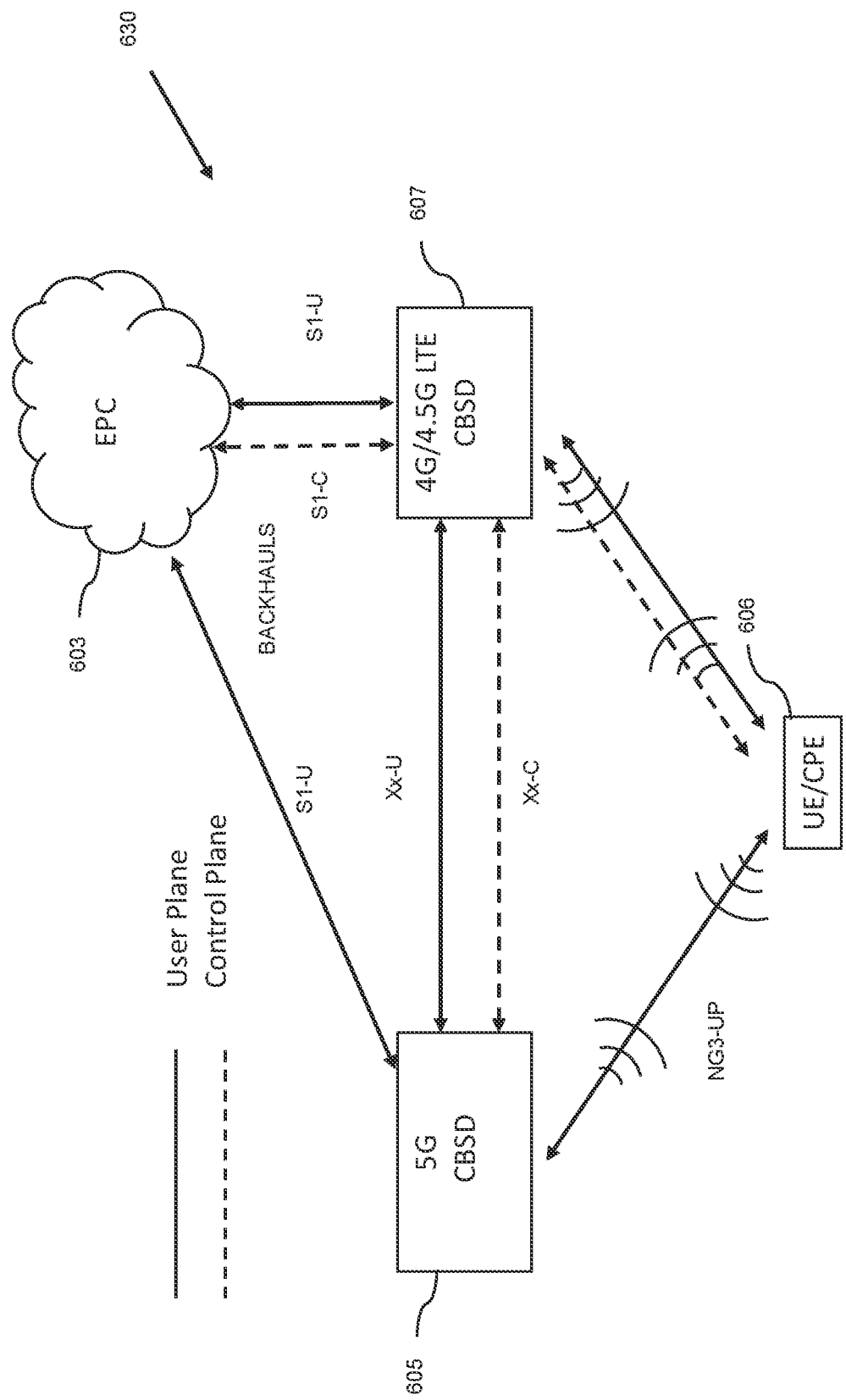
FIG. 6C is a block diagram showing a typical prior art 3GPP NSA Option 3x network configuration.
Figure 6D:
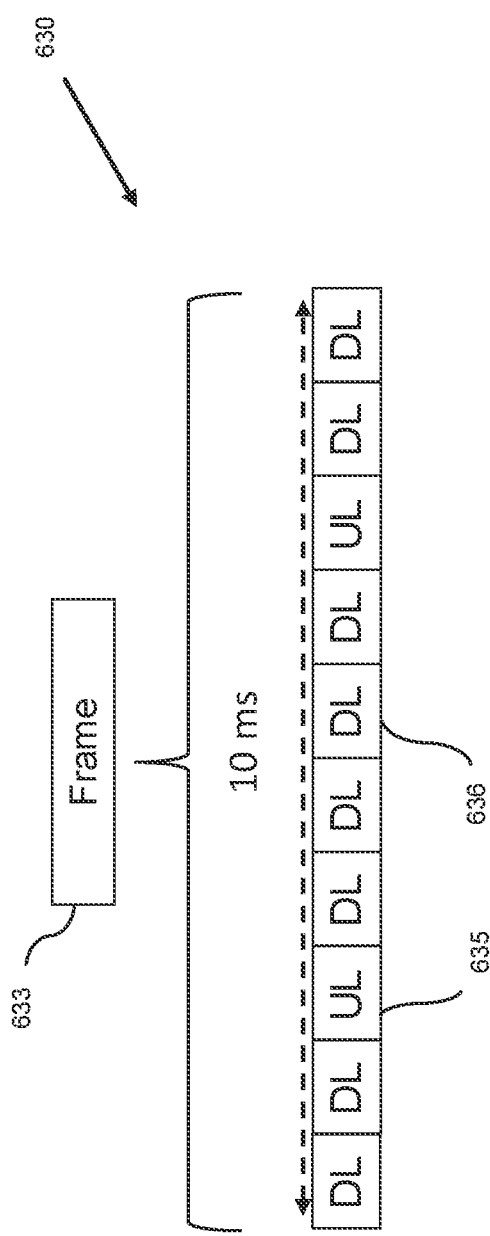
FIG. 6D is a graphical illustration showing a typical TDD framing structure used by the network of FIG. 6.
Figure 7D:
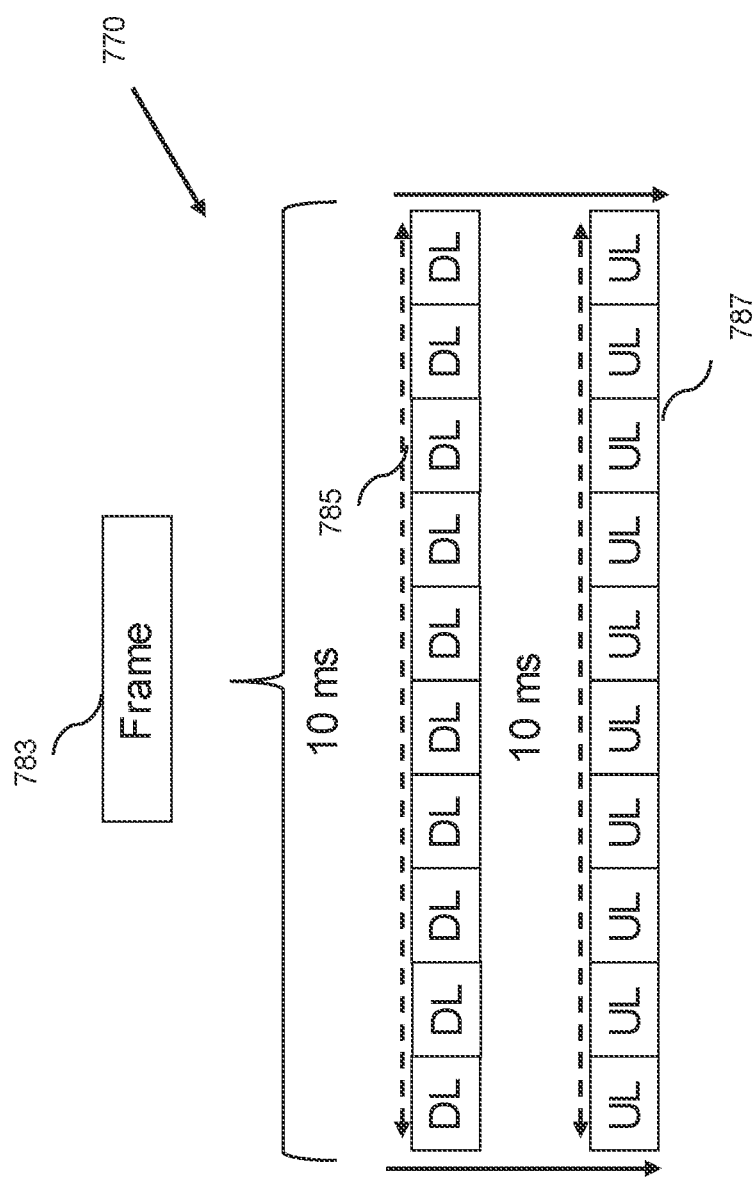
FIG. 7D is a graphical illustration showing a typical "split" TDD framing structure used by the network architecture of FIG. 7.

FIG. 7D is a graphical illustration showing a typical "split" TDD framing structure used by the network architecture of FIG. 7. As shown in FIG. 7D, the frame 783 consists of only DL or UL sub-frames (by contrast to FIG. 6D where in the frame 633 can consist of both UL and DL sub-frames or slots).

It will be appreciated that the use of allocating the whole frame (or multiple frames) to DL or UL, and transmitting to and receiving from both of the 4G and 5G CBSDes simultaneously, allows for a very efficient usage of time and frequency resources. By contrast, in the prior art architectures, while a UE is sending UL data, the base station buffers the DL data until the base station switches from UL to DL sub-frames, which causes additional delay in the data transmission. In addition, since the base station is transmitting DL and UL data simultaneously, the spectral efficiency and the throughput is significantly reduced.

For instance, frames 785 and 787 in FIG. 7D can be allocated to DL and UL respectively, where each one is transmitted using a different frequency. In this scenario, the spectrum efficiency can approach twice that of the TDD scheme of FIG. 6D.

It will also be appreciated that while some embodiments of the disclosure are described in terms of a "complete" split of traffic between DL and UL on separate links (i.e., all UL traffic is allocated to one interface, and all DL traffic is allocated to another), this is not a strict requirement, and in fact the disclosure contemplates certain "hybrid" configurations where e.g., one link is dedicated for some unidirectional traffic, and the other link is used for bi-directional traffic (at least during certain prescribed time periods or numbers of frames).

Enhanced Base Station (BSe)—

Figure 8:
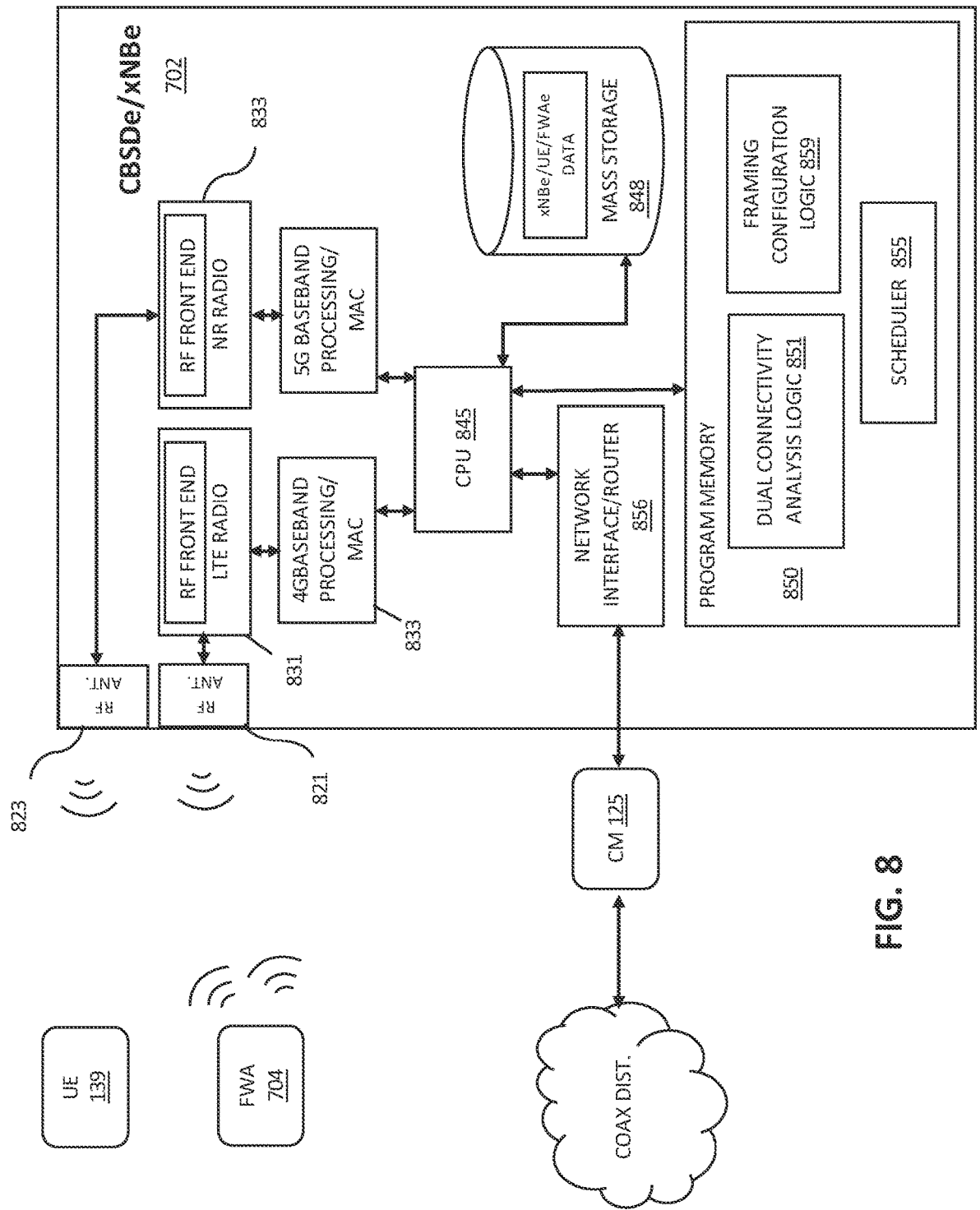
FIG. 8 is a block diagram illustrating an exemplary embodiment of a CBSDe/xNBe base station apparatus configured for dual connectivity, split-mode operation according to the present disclosure.

FIG. 8 is a block diagram illustrating one exemplary embodiment of enhanced base station (BSe) apparatus 702 configured for provision of enhanced dual-connectivity operation (including "split" mode) functions according to the present disclosure. In this exemplary embodiment, the BSe of FIG. 7 is specifically configured as a CBSD/xNB; i.e., (i) to operate using CBRS quasi-licensed spectrum for at least one of its radio links, and (ii) to utilize 3GPP 4G and 5G technology for the respective links pursuant to 3GPP dual-connectivity mode/NSA operation.

As shown, the CBSDe/xNBe 702 includes, inter alia, a processor apparatus or subsystem 845, a program memory module 850, mass storage 848, one or more network interfaces 856, as well as radio frequency (RF) devices 831, 833 having, inter alia, respective antenna(e) 821, 823 and each having one or more 4G/5G radio(s) as applicable.

At a high level, the CBSDe/xNBe maintains both a 3GPP-compliant LTE/LTE-A/"stack" (acting as a EUTRAN eNB) and a 5G NR stack (acting as 5G gNB) for dual-connectivity communications with 3GPP-compliant FWAe 704, UEs (mobile devices 139), as well as any other protocols which may be required for use of the designated frequency bands such as e.g., CBRS GAA or PAL band, and/or mmWave bands.

As illustrated, the CBSDe/xNBe device 702 includes dual connectivity analysis logic 851, and framing configuration logic 859, such as may be rendered in software or firmware operative to execute on the CBSDe processor (CPU) or a dedicated co-processor thereof.

The DC analysis logic 851 and framing logic 859 collectively include a variety of functions including receipt and assembly of data relating to the individual data carried by the CPEe 704 (discussed in greater detail below). The analysis logic 851 is in one variant configured to analyze data traffic types and patterns (including QoS and latency requirements, and traffic throughput), such as to enable (i) determination of whether "split" mode operation is warranted, and (ii) determination of which link (e.g., 4G/4.5G or 5G NR) is best for carrying a certain type of traffic (e.g., UL or DL for certain applications).

As one example, the analysis logic 851 may evaluate latency requirements for VR or AR (virtual or augmented reality) applications executed on the client devices served by the FWAe which may have very strict maximum latency limits (e.g., to avoid "jerkiness" or other artifact for the user). While NSA ostensibly does not yet support the "1 ms roundtrip" latency guarantees of the complete 5G infrastructure planned, the 5G NR interface may provide latency benefits over the 4G interface for such applications. Moreover, if the 5G interface is operating at appreciably higher frequency (e.g., mmWave, or even 6 GHz versus say 2 GHz for the 4G link), the data rates achievable by the 5G link may significantly outstrip those of the 4G link, and hence may be better suited for bandwidth-intensive applications such as downloading 4K or 8K HEVC video movies. Yet other examples where one interface is better suited than another for a given application will be recognized by those of ordinary skill when given this disclosure.

In one implementation of the analysis logic, given that the CPEe can send DL and UL data using either 4G or 5G links, the logic may be configured to select a 5G-enabled CBSDe first (especially for the UL, since the UL data transmission latency is lower for 5G). Moreover, the present disclosure contemplates that 4G and 5G CBSDe devices can coordinate among each other (and the CPEe), such as based on their then-available processing power. When a 4G CBSD has processing power available, the CPEe can use the 4G CBSD to send UL or DL data, and similarly, the CPEe can use a 5G CBSDe to send UL or DL data when suitable base station resources are available.

A further consideration by the exemplary analysis logic 851 relates to the presence of sufficient data on both DL and UL to warrant split-mode entry. As previously noted, consumer premises served by FWA such as the CBRS FWAe 704 often have WLANs serving multiple clients, and other devices, which are backhauled by the FWA and base station(s). These client devices, in some contrast to a typical mobile device, may provide a more uniform and ever-present demand for both UL and DL transmissions. For instance, one user may be watching a streaming video/movie, which is largely all DL traffic.

Conversely, another use may be simultaneously uploading a locally generated video (e.g., Zoom session), while another is downloading a large file, while another is using a VR/AR application, and so forth. Hence, the traffic profile for a given premises may warrant utilization of both (i) dual connectivity mode, and (ii) split mode (at least part of the time) versus use of a single air interface to e.g., stream a movie for a single mobile cellular handset. Additionally, since the FWAe is not a battery-powered device in typical applications, battery drain due to maintenance of two air interfaces is not a consideration, whereas sustained DC, split mode operation of a mobile cellular device may be a salient factor. Further, mobile devices supporting dual connectivity (DC) should have both 4G and 5G chipsets. Additionally, since the mobile device's location may change, the DC probability (i.e., availability to establish DC operation) may also change accordingly, which means that the mobile device might not have 4G and 5G coverage at the same time at a particular location. As such, the logic may be configured to consider one or more of the foregoing factors (e.g., device type, chipset configuration, etc.) in allocating modes of operation for particular devices.

Another aspect that can be optionally evaluated by the FWAe logic 851 includes channel quality and stability aspects. As a brief aside, there are different aspects relating to channel quality or capacity as it relates to device mobility. Regarding a hypothetical UE, the channel between the UE and base station changes when the UE moves from one location to another, or the UE is mobile (in transit). Additionally, the channel itself can vary independent of the UE or base station; for instance, pedestrians, buildings, and other objects physically within the propagation path of the channel create changes in the channel. Further, the base station itself can affect the channel; however since base stations are generally fixed, channel dynamics are not affected.

Additionally, in determining the impact of mobility of the UE, there are several aspects to be considered, including: (i) path loss, (ii) shadowing, and (iii) fading. A mobile UE experiences each of these aspects because of its mobility, and channel conditions can vary frequently and abruptly. However, in the exemplary FWA environment of FIG. 7, there will generally only be path loss and fading impact, and there will not be abrupt changes in the channel. Notably, in mobility environments, such stability is not present, and abrupt changes may occur on a frequent basis. As such, exemplary embodiments of the present disclosure can leverage this stability in ways that a mobile device cannot, including in some variants extending the CQI measurement intervals and/or building CQI statistics for each CPEe/FWAe, as described in co-owned and co-pending U.S. patent application Ser. No. 17/083,144 filed Oct. 28, 2020 and entitled "METHODS AND APPARATUS FOR ENHANCING SCHEDULER FAIRNESS IN SMALL-CELL WIRELESS SYSTEMS," which is incorporated herein by reference in its entirety.

Hence, in one variant of the channel analysis logic, the CQI values can be used as a typically reliable assessment of channel quality between the fixed base station (BSe) and the fixed FWAe, as well as the stability of the channel. This information can be considered by the logic 851 in determining which link/interface (i.e., 4G or 5G) is best suited for a given type of traffic. For instance, a highly variable physical channel may not support precise latency or other performance requirements for certain types of traffic to/from the FWAe 704. In that different bands (including markedly different frequencies ranging from sub-1 GHz to mmWave frequencies) may be used in certain embodiments of the architecture of FIG. 7, the channel quality/stability aspects of these channels may vary appreciably, thereby enabling differentiation by the logic 851 for different application types or requirements and allocation of the links in "split" mode operation to certain types/directions of data.

Regarding the framing configuration logic 859, in one embodiment, this logic is configured to implement the selected allocation of traffic (e.g., UL on one link, DL on another) using a TD (time division) based slot protocol—see FIG. 7D discussed above. As previously discussed, in normal 3GPP TDD mode of operation, data transmission is switched (e.g., on a per-slot basis) back and forth for UL and DL transmissions on a given single link. This leads to inefficiencies, including the switching logic and overhead necessary, as well as the need to buffer data on each link until the next available slot or group of slots are accessible. The logic 859 of the exemplary BSe 702 of FIG. 8 avoids these disabilities by using each link as a uni-directional data pipe for at least periods of time (e.g., a frame, several frames, or indefinitely). Since the 3GPP protocols already support TDD slots and framing, the frame configuration logic 859 of FIG. 8 (and correspondingly that of the FWAe logic of FIG. 9) advantageously simply schedule the same slots, but with all of the same direction of data, during the "split" mode of operation. This approach also has benefits for the scheduler logic 855 of the BSe, since the downstream scheduling is simplified (i.e., while different client devices and applications served may require different scheduling/prioritization, the scheduler in effect has a bigger/faster data pipe to work with since al DL transmissions will occur in contiguous time slots). Another advantage is use of less computing power of the base station for scheduling processes.

Yet other variants of the CBSDe logic 851, 859 may be configured to selectively alter other parameters that can be used to optimize channel throughput, such as selective invocation of spatial multiplexing or spatial diversity, where the CPEe and the physical channels can support it (on a per-interface basis).

In the exemplary embodiment, the processor 845 may include one or more of a digital signal processor, microprocessor, field-programmable gate array, GPU or plurality of processing components mounted on one or more substrates. The processor 805 may also comprise an internal cache memory, and is in communication with a memory subsystem 850, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 821, 823 are configured to detect and transceive signals from radio access technologies (RATs) in the service area or venue with which the CBSDe/xNBe 702 is associated. For example, LTE (including, e.g., LTE, LTE-A, LTE-U, LTE-LAA) signals may be used as the basis of communication between the CBSD/xNBe LTE radio 831 and the various mobile devices (e.g., UEs 139) or FWAe 704, while 5G mmWave or 6 GHz bands may be used by the antennae 823 and 5G radio 833. Each of the antenna(s) 821, 823 may include multiple spatially diverse individual elements in e.g., a MIMO- or MISO-type configuration, such that spatial diversity of the transceived signals can be utilized for e.g., increase in coverage area. Spatial multiplexing (SM) may also be utilized by the xNBe 702 to enhance data throughput; i.e., by multiplexing data streams on different antennae. As can be appreciated, with smaller e.g., mmWave or 6 GHz wavelengths, the size of the array 823 for the 5G interface may vary significantly from that of the 4G?4.5 G interface.

The RF radios 831, 833 in one embodiment comprises a digitally controlled RF tuner capable of reception of signals via the RF front end (receive chain) of the RF radio(s) in the aforementioned bands, including in one variant simultaneous reception and transmission from the respective interfaces (e.g., both CBRS 3.550 to 3.700 GHz and 2.300 to 2.500 GHz, bands, CBRS and 600 to 800 MHz bands, or Band 71 and Band 12/17 in another configuration, CBRS and mmWave in another, and so forth). In another variant, mmWave frequencies (e.g., 42-100 GHz) may be used by the air interface(s), especially in applications where direct LOS transmission is possible. In cases where the CBSDe 702 includes multiple interfaces of each type (e.g., two 4G or two 5G interfaces), they may also be "traded off" or used selectively with certain constituent CPEe, such as where a first mmWave band interface and an LTE or similar interface is used for some CPEe, and other 5G and 4G interfaces are used for other CPEe (e.g., dividing load from many served CPEe across different pairs of interfaces), based on their reported bandwidth requirements, based on presence of LOS or physical obstructions between the CBSDe and the CPEe, etc.

Figure 8A:
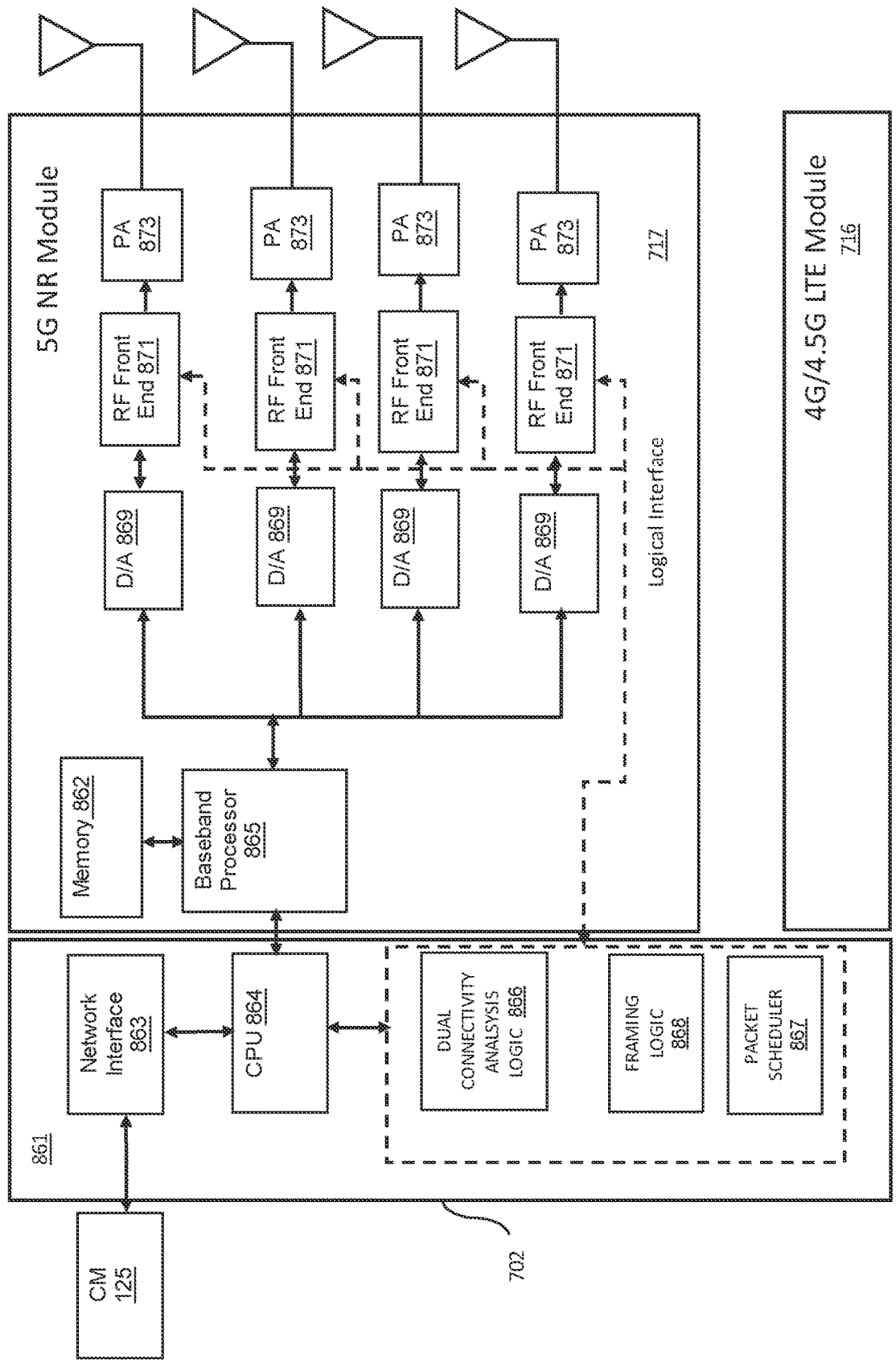
FIG. 8A is a block diagram illustrating another exemplary embodiment of a CBSDe/xNBe base station apparatus according to the present disclosure.

FIG. 8A is a block diagram illustrating one exemplary implementation of the enhanced base station (e.g., xNBe) of FIG. 8, illustrating different antenna and transmit/receive chains thereof for the different radios 831, 833.

As illustrated, the device 702 includes a common module 861, and the two radio interfaces 716, 717 (only the 5G interface 717 shown in detail for simplicity). Each interface generally includes a baseband processor 865, one or more D/A 869, one or more RF front ends 871, one or more power amplifiers 873, channel analysis logic 866, and configuration selection and storage logic 868, with comparable functionality to that described previously with respect to FIG. 8. Additionally, the exemplary embodiment of the common module 861 includes a CPU 864, a network interface 863 that interfaces the xNBe to connect to a data network via e.g., a CM 125, such as for wireline backhaul of the CBSDe to an MSO core or headend, and a program memory with DC analysis logic 866 and framing logic 868, as well as a packet scheduler 867.

The components of xNBe 702a shown in FIG. 8A may be individually or partially implemented in software, firmware or hardware. The RF front end 871 includes RF circuits to operate in e.g., licensed, quasi-licensed or unlicensed spectrum (e.g., Band 71, Bands 12-17, NR-U, C-Band, CBRS bands, mmWave, etc.). The digital baseband signals generated by the baseband processor 705 are converted from digital to analog by D/As 869. The front-end modules 871 convert the analog baseband signals radio received from D/As 869 to RF signals to be transmitted on the antennas. The baseband processor 865 includes baseband signal processing and radio control functions, including in one variant physical layer and Layer 2 functions such as media access control (MAC). The Power Amplifiers (PA) 773 receives the RF signal from RF front ends, and amplify the power high enough to compensate for path loss in the propagation environment.

It will also be appreciated that the individual transmitter/receiver chains of e.g., the device 702a of FIG. 8A may be controlled differently than others with respect to configuration (e.g., MCS) based on channel conditions. For instance, in 2× spatial multiplexing configuration (e.g., two antenna elements transmitting different data streams), the physical channels between the two different antenna elements and the receiving CPEe antenna element(s) may conceivably be different, and hence one chain might use an MCS (and/or other configuration parameter) different than the other. Similarly, one chain may use different values of parameters. Similar logic may be applied for spatial diversity configurations which enhance coverage area.

As such, individual transmitter/receiver channels and chains may be "tuned" or optimized by the logic of the CBSDe so as to achieve best data rate given the individual environment of each.

CPEe Apparatus—

FIG. 9 illustrates one exemplary embodiment of an enhanced CPE 704 (here, configured as a CBRS FWAe; e.g., roof-mounted or façade-mounted FWA with associated radio heads and CPEe electronics) configured according to the present disclosure.

It will also be appreciated that while described in the context of a CBRS-compliant FWA, the interfaces 920, 926 of the device of FIG. 9 may be readily adapted to other spectra and/or technologies such as e.g., mmWave, Multefire, DSA, LSA, or TVWS as supported by their underlying 3GPP technology and protocols.

In one exemplary embodiment as shown, the CPEe/FWAe 704 includes, inter alia, a processor apparatus or subsystem such as a CPU 902, flash memory or other mass storage 904, a program memory module 910 with split mode logic 906, 4G baseband processor module 916 with 4G/4.5G stack 918, 5G baseband processor module 912 with 5G NR stack 914 (here also implemented as software or firmware operative to execute on the processor), one or more backend interfaces 908 (e.g., USB, GbE, etc.), power module 932 (which may include the aforementioned PoE injector device), a WLAN/

BLE module 934 with integrated WLAN router and antennae 936, and 5G wireless radio interface 920 and 4G/4.5G radio interface 926 for communications with the relevant RANs (e.g., 5G-NR RAN and 4G/4.5G RAN) respectively, and ultimately the EPC in the Option 3 NSA mode.

In one implementation, the CPEe includes a dual-radio chipset (e.g., 4G and 5G radio ICs) which are used for establishment of the DC mode (and split-mode).

The RF interfaces 920, 926 are configured to comply with the relevant PHY standards which each supports, and include an RF front end 922, 928 and antenna(s) elements 924, 930 tuned to the desired frequencies of operation (e.g., adapted for operation in 3.55-3.70 GHz band, 5 GHz for the LTE/LTE-A bands, C-Band, NR-U bands, mmWave bands, etc.). Each of the UE radios may include multiple spatially diverse individual elements in e.g., a MIMO- or MISO-type configuration, such that spatial diversity of the received signals can be utilized. Beamforming and "massive MIMO" may also be utilized within the logic of the CPEe/FWAe device.

In one embodiment, the various processor apparatus 902, 912, 916 may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 912.

The various BB processor apparatus may also comprise an internal cache memory, and a modem.

The program memory module 910 may implement one or more of direct memory access (DMA) type hardware, so as to facilitate data accesses as is well known in the art. The memory module of the exemplary embodiment contains one or more computer-executable instructions that are executable by the CPU processor apparatus 902.

In this and various embodiments, the processor subsystem/CPU 902 is configured to execute at least one computer program stored in program memory 910 (e.g., a non-transitory computer readable storage medium). A plurality of computer programs/firmware are used and are configured to perform various functions such as communication with relevant functional modules within the CPEe/FWAe 704 such as the radio head and WLAN/BLE module 934.

Other embodiments may implement the split mode logic 906 functionality within dedicated hardware, logic, and/or specialized co-processors (not shown). In another embodiment, the module logic 906 is integrated with the CPU processor 902 (e.g., via on-device local memory, or via execution on the processor of externally stored code or firmware).

In some embodiments, the CPEe 704 also utilizes memory or other storage configured to hold a number of data relating to e.g., the various network/gNBe configurations for split mode operation. For instance, the CPEe/FWAe 704 may recall data relating to SINR to CQI mapping used with a given gNBe 702 or RAN from storage. This functionality can be useful for example when the FWAe is disposed at a location potentially served by several different DC/split-mode capable CBSDe 702; in the case where a given CBSDe or wireless channel associated therewith becomes unavailable or non-optimized for whatever reason, the CPEe can selectively transfer to another serving (candidate) CBSDe (including one which is part of another site's NodeB infrastructure), including recall of prior data obtained therefrom as at least a starting point for analysis of prospective split mode operation, and further optimization of the then-current wireless channel. Likewise, in the case where an antenna element or elements is/are moved for whatever reason (e.g., the premises installation is changed), prior data for the same or different CBSDe can be used by the CPEe during post-change optimization.

In some variants, the CPEe logic 906 may also be configured to utilize actual packet throughput data (e.g., an application such as "iPerf" for determining actual data throughput versus lower-layer processes such as based on BER/PER, etc.). In effect, the CPEe can utilize operating processes such as applications obtaining streaming data on the DL or uploading data on the UL to assess the need for split-mode operation. For instance, the CPEe logic 906 may evaluate traffic patterns, demand, throughput, QoS or latency requirements, etc. before deciding to request split-mode operation from the cognizant CBSDe(s) 716, 717, or similarly to request a return to non-split mode operation.

It will also be appreciated that while various embodiments of the CPEe and methods (below) are described in terms of the CPEe 704 being the instigating entity for split-mode operation (i.e., by issuing a request to one or both CBSDe with which it has connected), the present disclosure contemplates other approaches, including where one or both of the CBSDe instigate the entry into split-mode. As such, the split-mode entry/exit processes may be client-side driven, network-side driven, or combinations thereof. As one example, the CBSDe(s) or another network process may periodically poll the DC-capable CPEe within the network to determine traffic load or other such data; based on the polled data, entry to or exit from split-mode operation may be invoked. In that DC operation is a prerequisite for split-mode operation, entry to/exit from DC operation may also be similarly controlled; e.g., such as where a given CPEe must successfully be operating in DC mode (i.e., RRC_Connected or similar on both links) before it can be considered for split-mode operation.

It is further appreciated that the network is typically tasked with scheduling UL and DL resources (e.g., allocation of sub-frames to the UL and DL) to each CPEe/FWAe 704. The network scheduler may assign any set of Resource Blocks (RB) for the given CPEe based on e.g., Channel Quality reports form the CPEe to the 4G and 5G CBSDes 716, 717. In one variant, the CPEe logic 906 calculates the Signal-to-Interference-Plus-Noise (SINR) in DL channels from the respective CBSDes, and maps SINR to a Channel Quality Indicator (CQI) value in a look-up table, and reports respective CQI value(s) to its associated 4G and 5G CBSDes. Then, each CBSDe 716, 717 reports its CQI value to the network (e.g., the EPC), and the EPC can schedule the target CPEe based on the feedback it received from the CPEe.

In one embodiment, the CPEe may turn on the split-mode (and dual connectivity mode) when the traffic load of the CPEe is higher than a pre-defined threshold. For instance, in some scenarios, several users may be connected to the CPEe via a WLAN or similar, receiving DL data and transmitting UL data (e.g., streaming videos, playing online games, etc.), which causes reduced throughput per user. Therefore, in such scenarios, the CPEe will request to turn on the dual connectivity mode, and split its transmitting and receiving traffic load between the two base stations 716, 717.

It will also be appreciated that in certain scenarios, the CPEe logic (and/or the corresponding CBSDe logic previously described) may be configured to invoke a 'learning' algorithm (e.g., machine learning or ML via e.g., a cloud ML process with which the CPEe/CBSDes are in data communication), whereby traffic load and other factors are considered to adaptively turn on or off the dual connectivity/split operation modes.

It will also be appreciated that while the aforementioned process envisions the capability of the CPEe such as a CBRS FWAe device to establish dual connections with different 3GPP access technologies in an NSA network, the present disclosure also contemplates configurations wherein a mobile device establishes communications with different 3GPP access technologies. For example, a UE connected to a 4G base station may measure the SINR of the neighboring 5G cell to establish connection to the neighbor base station, and split its DL/UL traffic load between the two base stations.

Methodology—

Figure 10:
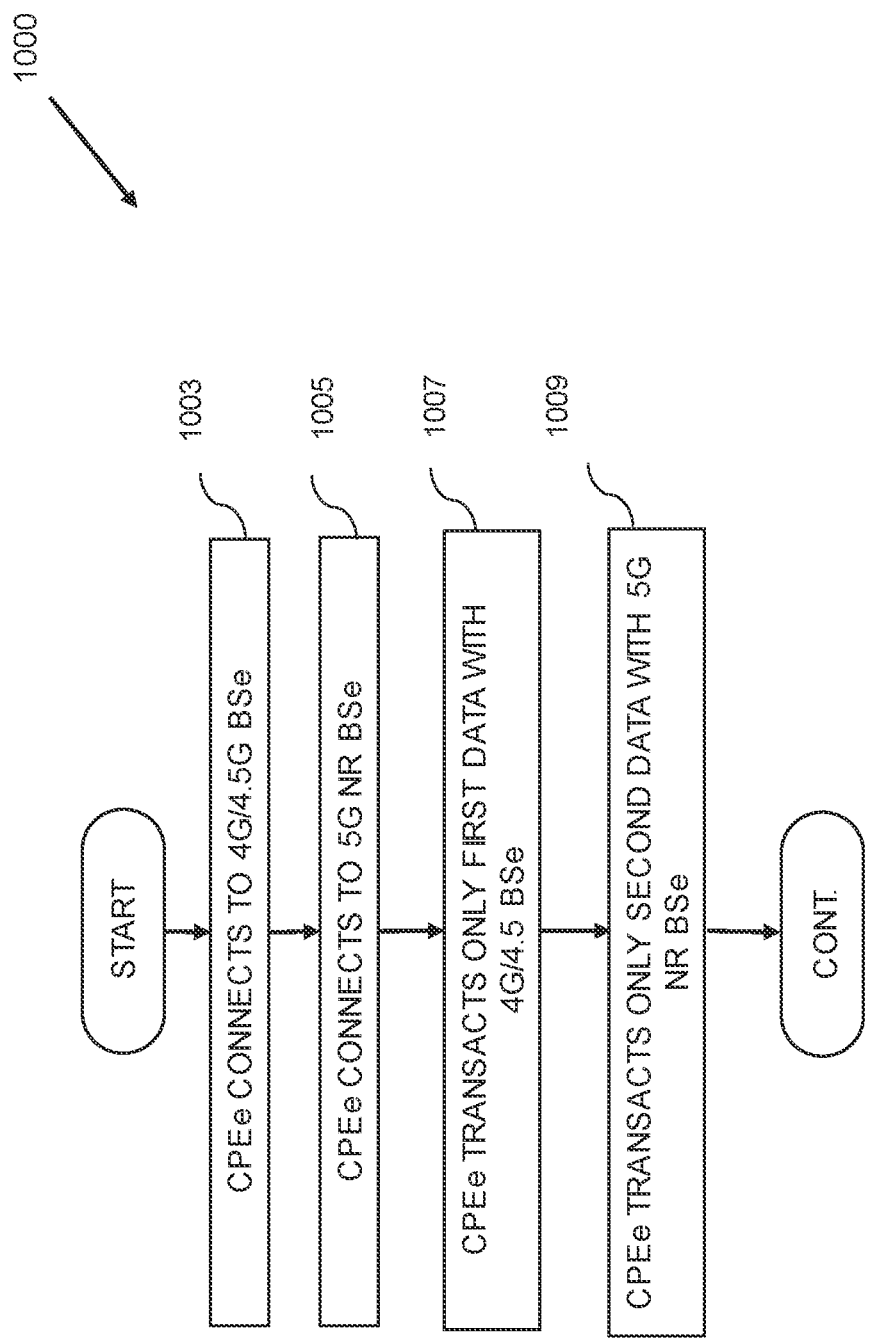
FIG. 10 is a logical flow diagram of an exemplary embodiment of a generalized method of dual-connectivity, split mode wireless operation via an enhanced CPE/FWA, according to the present disclosure.
Figure 11A:
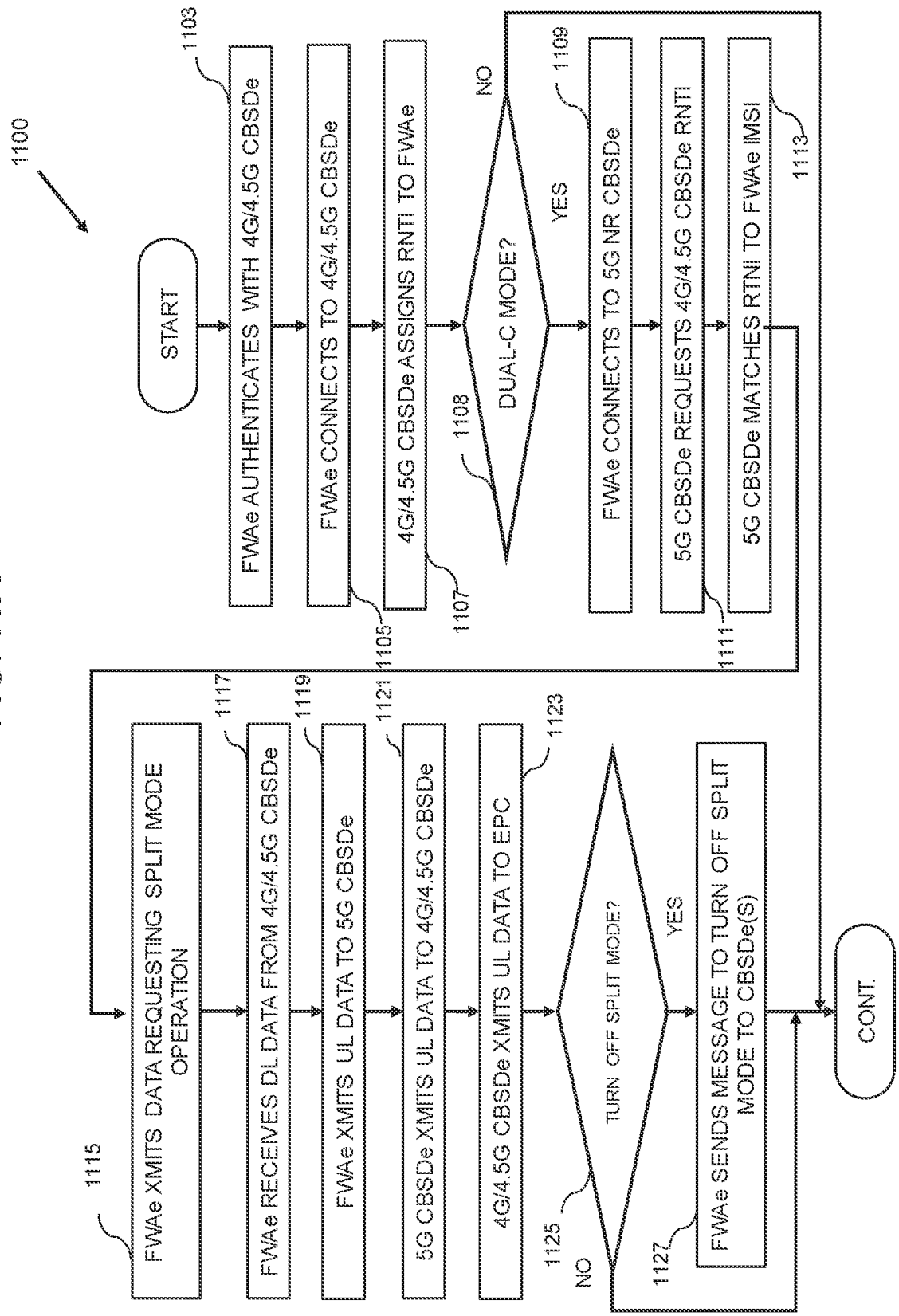
FIG. 11A is a logical flow diagram representing another implementation of the generalized method of FIG. 10, wherein the 5G NR CBSDe is used for UP data uplink, and the 4G/4.5G CBSDe is used for UP data downlink.
Figure 11B:
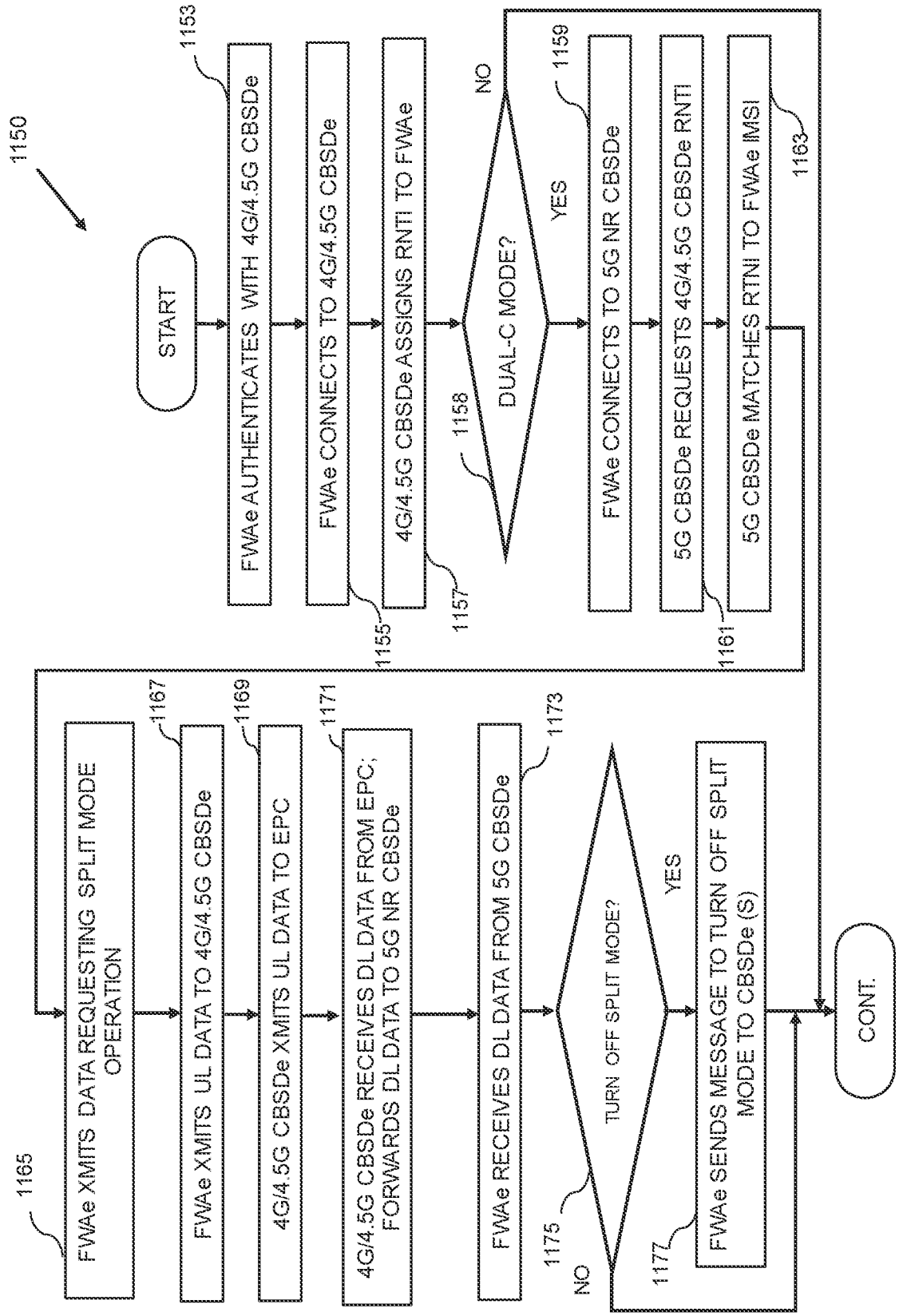
FIG. 11B is a logical flow diagram representing an alternate implementation of the generalized method of FIG. 10, wherein the 5G NR CBSDe is used for UP data downlink, and the 4G/4.5G CBSDe is used for UP data uplink.
Figure 12:
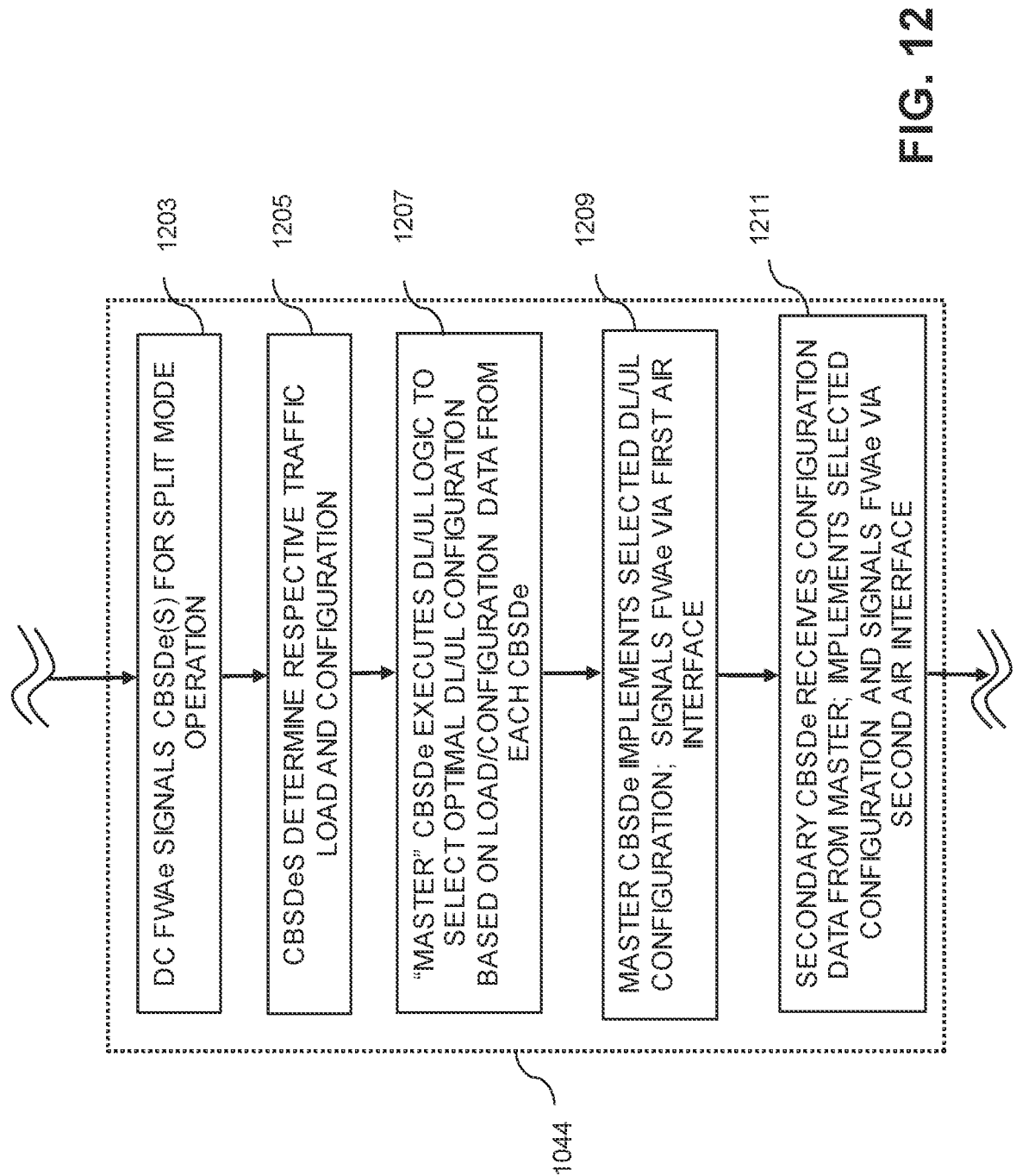
FIG. 12 is a logical flow diagram representing one implementation of the split mode configuration and entry process of the method of FIG. 10.

Various embodiments of methodologies for enhancing throughput utilizing dual connectivity (DC) and split-mode operation according to the present disclosure are now described with respect to FIGS. 10-12.

FIG. 10 is a logical flow diagram of an exemplary embodiment of a generalized method of dual-connectivity, split mode wireless operation via an enhanced CPE/FWA, according to the present disclosure. Per step 1003 of the method 1000, the CPEe 704 is authenticated and registered with the network via the 4G/4.5G CBSDe 716.

Per step 1005, the CPEe also connects to the 5G CBSDe 717. By connecting to 5G CBSDe, the CPEe indicates that it is entering dual connectivity mode.

Once in DC mode, the CPEe then selectively turns on split-mode operation depending on one or more parameters such as e.g., the traffic load, as discussed elsewhere herein.

Per step 1007, the CPEe transacts only a first type of data (e.g., UL data) with the 4G CBSDe 716 for at least a period of time (e.g., prescribed number of frames or similar).

Per step 1109, the CPEe transacts only a second type of data (e.g., receives DL data) with the 5G CBSDe 717 for at least a period of time. In one variant, the transaction of data by the CPEe with each CBSDe is coupled to the other; e.g., when the CPEe exits from the split-mode on one connection, the other connection also exits the split-mode, and normal TDD operation of each link is resumed.

Figure 10A:
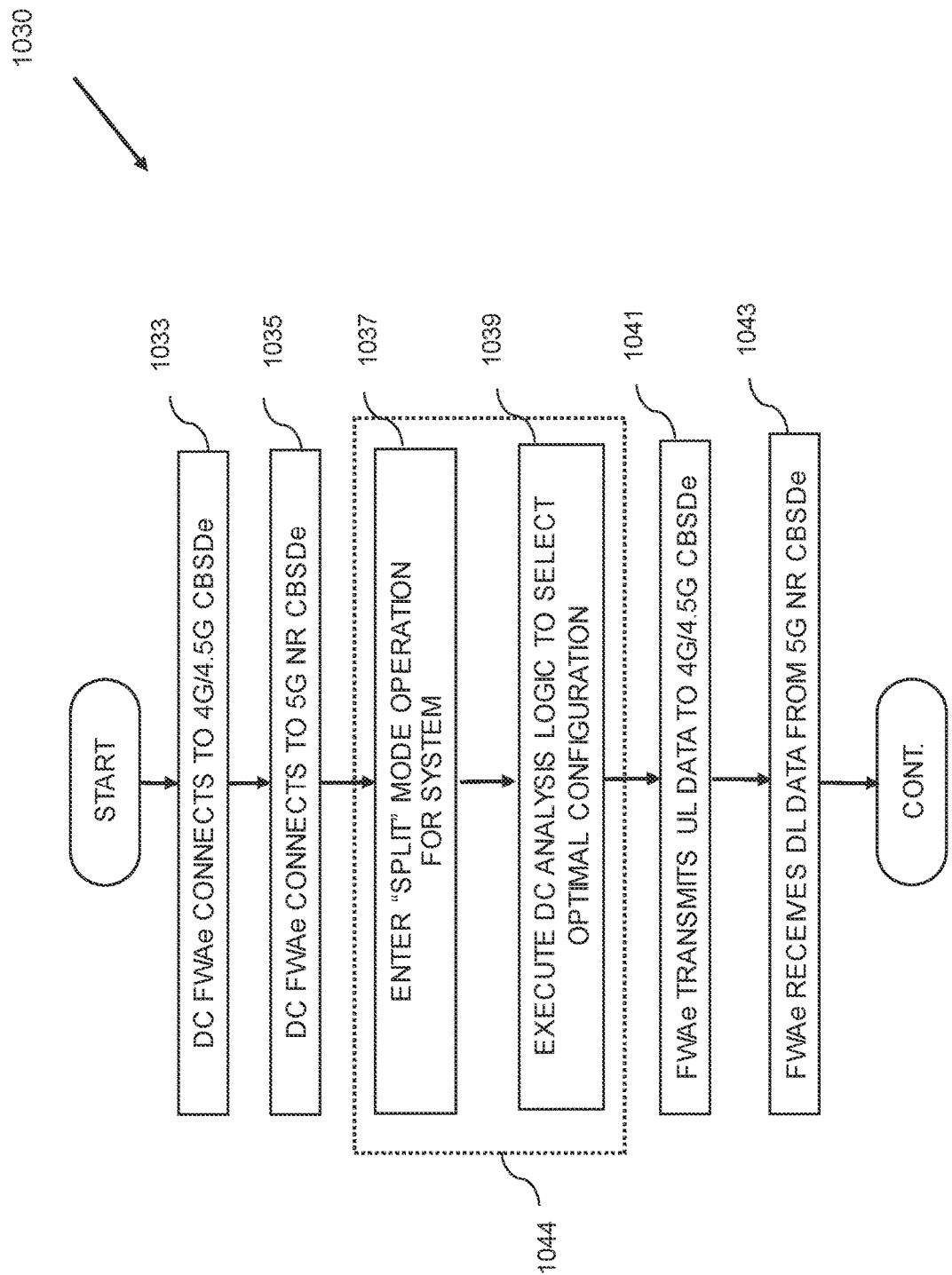
FIG. 10A is a logical flow diagram representing one implementation of the generalized method of FIG. 10.

FIG. 10A is a logical flow diagram representing one implementation of the generalized method of FIG. 10.

Per step 1033 of the method 1000, the CPEe 704 is authenticated and registered with the network via the 4G/4.5G CBSDe 716.

Per step 1035, the CPEe also connects to the 5G CBSDe 717. By connecting to 5G CBSDe, the CPEe indicates that it is entering dual connectivity (DC) mode.

Once in DC mode, the CPEe then signals its desire to enter split-mode operation, such as via a request issued to one or both CBSDe devices (step 1037). As part of this process, the system also executes the DC analytical logic 851 previously described in order to select the optimal configuration for the two connections, as discussed elsewhere herein (step 1039). For instance, in one variant, the analysis of step 1039 may indicate that at least for a prescribed period of time or number of frames (or until next evaluation, which may occur periodically or in an event-driven manner), the scheduling of data within the modified TDD frame structure for the 5G connection should handle only DL data, and the modified 4G TDD structure should handle only UL data, or vice versa.

Accordingly, per step 1037, the CPEe transacts only a first type of data (e.g., UL data) with the 4G CBSDe 716 for at least a period of time (e.g., prescribed number of frames or similar), and per step 1139, the CPEe transacts only a second type of data (e.g., receives DL data) with the 5G CBSDe 717 for at least the prescribed period. Note that these roles may also be switched in some scenarios, depending on changes in prevailing parameters which are input to the evaluation process of step 1039. For example, if an application executing on a client switches from heavy use of data download to heavy use of uploads, this may change the traffic profile sufficiently to warrant switch of the roles of the connections. Similarly, if additional "download heavy" clients come online at the served premises associated with the CPEe, the traffic profile may change such that reversal is warranted. Other potential triggering scenarios include e.g., change in QoS or latency requirements for one application, change in the mix of applications executing on the clients, and others. Moreover, certain times of day/days of week, or event-driven periods (e.g., "lock down" in a pandemic) may have certain generic profiles associated with them (e.g., on weekend evenings, heavy streaming media delivery to the premises as people watch more movies, versus more heavy upload for Zoom conferences during the working week).

Figure 10B:
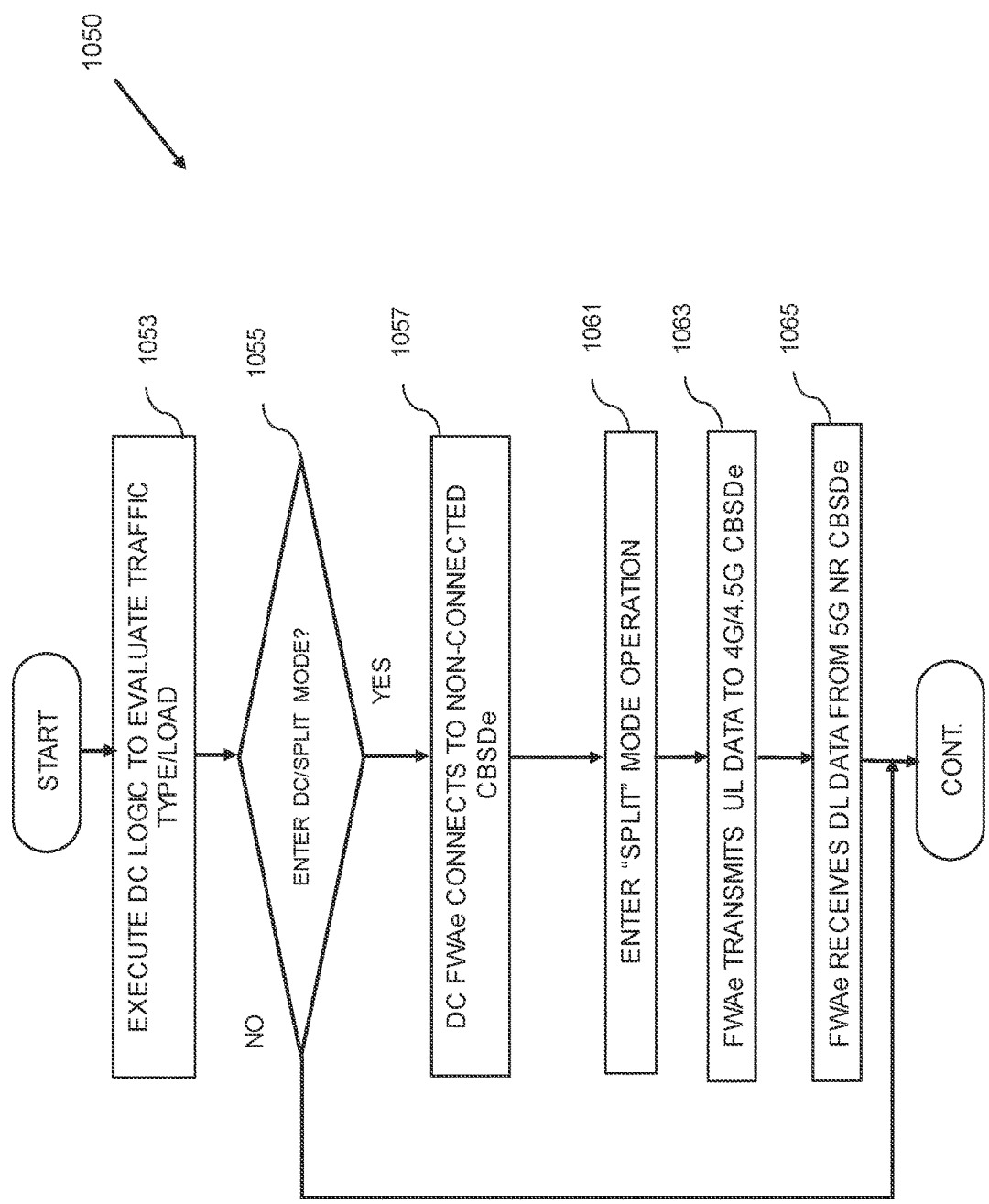
FIG. 10B is a logical flow diagram representing another implementation of the generalized method of FIG. 10.

FIG. 10B is a logical flow diagram representing another implementation of the generalized method of FIG. 10. In this implementation, the DC logic previously described is first executed per step 1053. That is, the determination of whether split mode operation (and hence DC operation) is required is first evaluated before any DC mode entry, such as while a single RRC connection is maintained (whether with the 4G or 5G CBSDe).

Per step 1055, if the analysis indicates that entry into split-mode (and DC) is required, the FWAe then initiates a connection (e.g., via authentication and other typical 3GPP protocols) for the unconnected interface to its respective CBSDe per step 1057. Then, per step 1061, split-mode operation is entered, and thereafter the FWAe transmits/receives data on the respective exemplary UL/DL interfaces as shown per steps 1063, 1065.

FIG. 11A is a logical flow diagram representing another implementation of the generalized method of FIG. 10, wherein the 5G NR CBSDe is used for UP data uplink, and the 4G/4.5G CBSDe is used for UP data downlink.

Per step 1103, the CPEe (e.g., CBRS FWAe 704) is registered and authenticated with the 4G/4.5G CBSDe 716.

Per step 1105, after the FWAe is authenticated, it connects to the 4G CBSDe. The connection between the FWAe and the 4G CBSDe is established via the 4G/4.5G radio transmit/receive chain and associated antenna operating at the prescribed frequency for that interface.

Per step 1107, the 4G/4.5G CBSDe assigns Radio Network Temporary Identifier (RNTI) to the FWAe. The RNTI is used by the CBSDe to identify the FWAe in the cell, according to 3GPP protocols.

Per step 1108, the FWAe turns enters the dual mode depending on the logic and input parameter(s) such as e.g., traffic load. For instance, in one variant, if the traffic load is not high, the FWAe continues on single mode operation using the 4G/4.5G interface only. It is assumed for purposes of this implementation that the DC analysis logic 851 is also executed as part of the DC determination; i.e., whether split mode operation is also warranted.

Per step 1109, the FWAe connects to the 5G CBSDe 717, and continues in dual connectivity operation.

Per step 1111, the 5G CBSDe requests the 4G/4.5G CBSDe to send it the obtained RNTI.

Per step 1113, 5G CBSDe maps the RNTI to its corresponding FWAe Mobile Subscriber Identity (MSI) in a lookup table. As previously discussed, the RNTI is more of a temporary identifier within the network, whereas the IMSI is a more persistent and long-term identifier for the UE (here FWAe) itself. Hence, the two data elements are correlated by the CBSDe to make the service association needed to support the split-mode of operation.

Per step 1115, the FWAe notifies the 4G and 5G CBSDe (whether each directly, or indirectly via the other) that it requests to operate in split mode.

Per step 1117, the FWAe receives DL data from EPC via the 4G/4.5G CBSDe as part of the split mode operation, and per step 1119, the FWAe transmits UL data to the 5G CBSDe.

Per step 1121, the 5G CBSDe transmits the UL data from the FWAe to the 4G CBSDe with the same RNTI specified for the FWAe.

Per step 1123, the 4G/4.5G CBSDe transmits the received UL data to the EPC with the same RNTI specified for the FWAe.

Per step 1125, if the exit criteria are met (e.g., traffic load is low), the FWAe turns off the split mode operation per step 1127, and continues either with DC operation (no split-mode) or single mode operation connected to the 4G CBSDe (the "master" in this scenario).

FIG. 11B is a logical flow diagram representing an alternate implementation of the generalized method of FIG. 10, wherein the 5G NR CBSDe is used for UP data downlink, and the 4G/4.5G CBSDe is used for UP data uplink.

Per step 1153, the CPEe (e.g., CBRS FWAe 704) is registered and authenticated with the 4G/4.5G CBSDe 716.

Per step 1155, after the FWAe is authenticated, it connects to the 4G CBSDe. The connection between the FWAe and the 4G CBSDe is established via the 4G/4.5G radio transmit/receive chain and associated antenna operating at the prescribed frequency for that interface.

Per step 1157, the 4G/4.5G CBSDe assigns Radio Network Temporary Identifier (RNTI) to the FWAe. The RNTI is used by the CBSDe to identify the FWAe in the cell, according to 3GPP protocols.

Per step 1158, the FWAe turns enters the dual mode depending on the logic and input parameter(s) such as e.g., traffic load. For instance, in one variant, if the traffic load is not high, the FWAe continues on single mode operation using the 4G/4.5G interface only. It is assumed for purposes of this implementation that the DC analysis logic 851 is also executed as part of the DC determination; i.e., whether split mode operation is also warranted.

Per step 1159, the FWAe connects to the 5G CBSDe 717, and continues in dual connectivity operation.

Per step 1161, the 5G CBSDe requests the 4G/4.5G CBSDe to send it the obtained RNTI.

Per step 1163, 5G CBSDe maps the RNTI to its corresponding FWAe Mobile Subscriber Identity (MSI) in a lookup table.

Per step 1165, the FWAe notifies the 4G and 5G CBSDe (whether each directly, or indirectly via the other) that it requests to operate in split mode.

Per step 1167, the FWAe transmits UL data to EPC via the 4G/4.5G CBSDe as part of the split mode operation, and per step 1169, the 4G CBSDe 716 transmits the UL data received from the FWAe to the EPC.

Per step 1171, the 4G CBSDe receives DL with the same RNTI specified for the FWAe, and forwards it to the 5G CBSDe.

Per step 1173, the 5G CBSDe receives the DL data and transmits it to the FWAe on the DL.

Per step 1175, if the exit criteria are met (e.g., traffic load is low), the FWAe turns off the split mode operation per step 1177, and continues either with DC operation (no split-mode) or single mode operation connected to the 4G CBSDe (the "master" in this scenario).

FIG. 12 is a logical flow diagram representing one implementation of the split mode configuration and entry process of the method of FIG. 10. In this implementation of step 1044, the CPEe (e.g., DC-capable FWAe 704) signals one or more CBSDe devices 716, 717 to request split-mode operation (step 1203). As previously discussed, the FWAe may in some configurations signal only one CBSDe, and by virtue of e.g., the X2 interface, that CBSDe may signal the other CBSDe to apprise it of the request; alternatively, the FWAe may signal both CBSDe independently.

Per step 1205, the CBSDe devices determine respective traffic and load conditions for that connected CPEe. In one variant, logic within each CBSDe is tasked with collecting and evaluating this data. In other variants, once CBSDe (e.g., the "master" is tasked with such processing/collection on behalf of the other "secondary" CBSDe). In yet another approach, the CPEe itself generates the traffic data and forwards it to one or both CBSDe, such as in a pre-formatted IE (information element) or even via higher layer process such as IP packets directed to a prescribed port or socket on the target CBSDe(s).

At step 1207, the master CBSDe executes the DL/UL analysis logic to select the optimal configuration, based on the data obtained or generated in step 1205. For instance, the logic may indicate that the 5G interface is best suited to carry the UL data.

Per step 1209, the master CBSDe implements the selected configuration, and signals the other CBSDe via the X2 interface, and signals the CPEe via a connected air interface (e.g., the 4G interface).

Lastly, per step 1211, the secondary CBSDe, upon receipt of the configuration data from the master, implements the configuration and signals the CPEe accordingly via the second air interface.

It will be appreciated that in some variants, signaling relative to the 4G and 5G interfaces (i.e., causing each to enter split-mode) can be accomplished via a single signaling by e.g., the master CBSDe to the CPEe.

Figure 13:
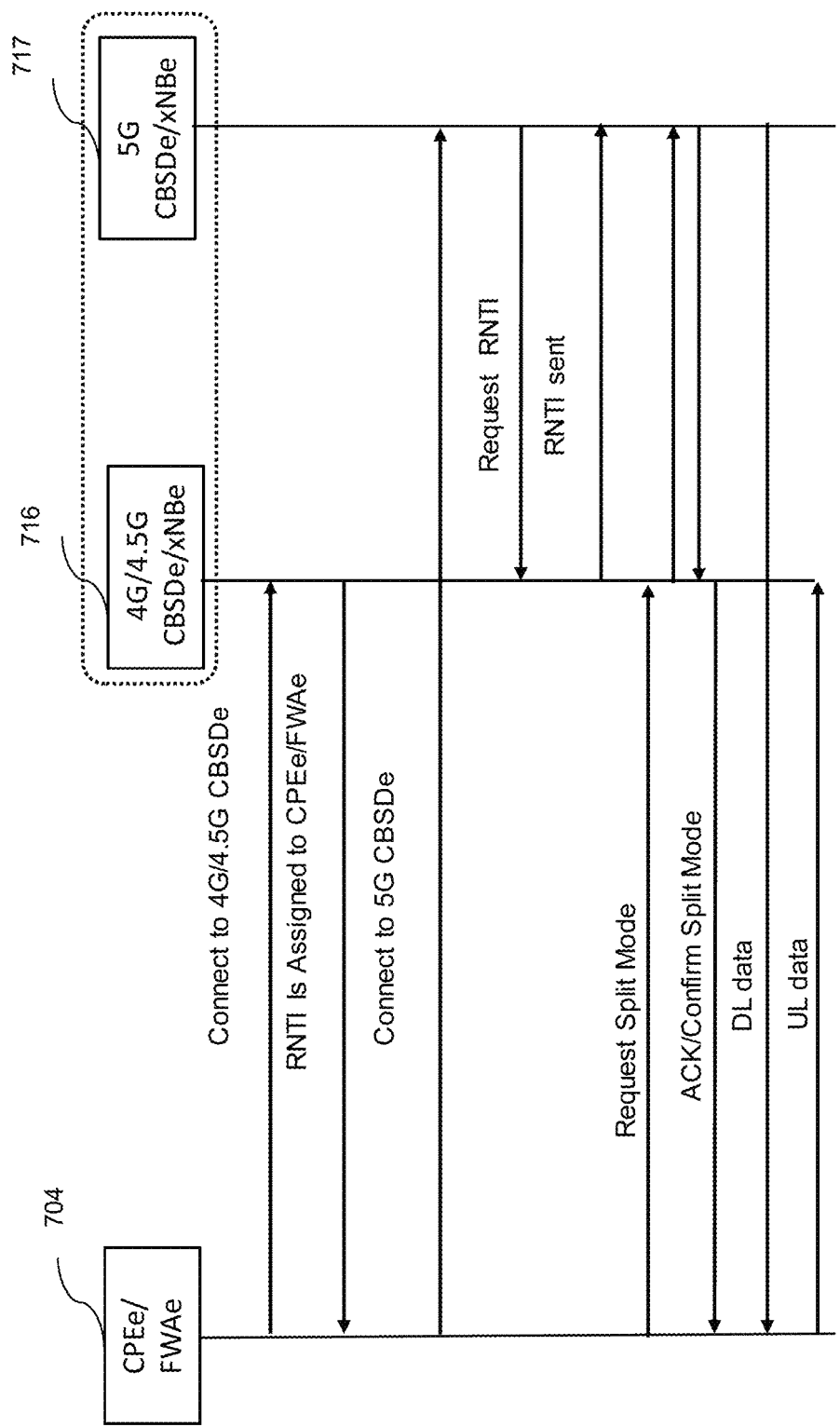
FIG. 13 is a ladder diagram illustrating communication and data flow between serving 5G NR and 4G/4.5G CBSDe/xNBe base stations and a served dual-connectivity, split-mode enabled FWAe, according to one embodiment of the present disclosure.

FIG. 13 is a ladder diagram illustrating one embodiment of the communication flow between CBSDe 702 (e.g., with constituent 4G and 5G CBSDes 716, 717) and the dual-connectivity, split-mode enabled CPEe/FWAe 704. As shown, in this example, the FWAe 704 first connects to both CBSDes 716, 717 via 3GPP dual connectivity mode, and then subsequently requests entry into split-mode-operation. Once both CBSDes confirm split-mode operation, and the RNTI is assigned (and associated with the IMSI), each is assigned a given "link" (e.g., the 5G CBSDe in this case acting as the DL, and the 4G CBSDe acting as the UL).

Service Provider Network—

Figure 14:
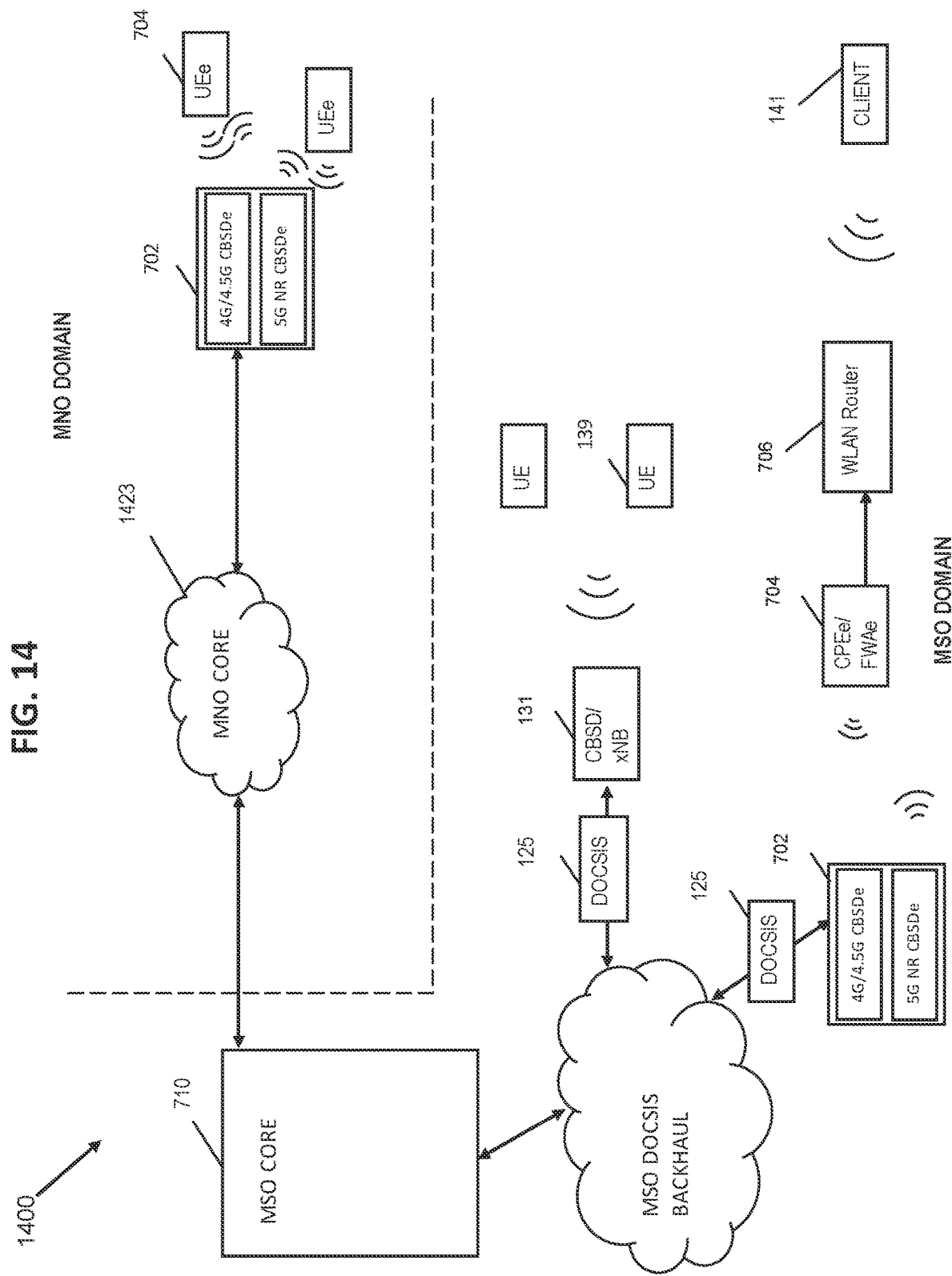
FIG. 14 is a block diagram illustrating one embodiment of an MSO/MNO cooperative network architecture utilizing the enhanced CBSD and CPE/FWA apparatus of the present disclosure.

FIG. 14 illustrates one embodiment of a service provider network configuration useful with the dual-connectivity, split-mode functionality and supporting 3GPP/CBRS-based wireless network(s) described herein. It will be appreciated that while described with respect to such network configuration, the methods and apparatus described herein may readily be used with other network types and topologies, whether wired or wireless, managed or unmanaged.

The exemplary service provider network 1400 is used in the embodiment of FIG. 14 to provide backhaul and Internet access from the service provider's wireless access nodes (e.g., CBSDe/xNBe devices, Wi-Fi APs, FWAe devices or base stations operated or maintained by the MSO), and one or more stand-alone or embedded DOCSIS cable modems (CMs) 125 in data communication therewith.

The individual CBSDe/xNBe devices (i.e., co-located 4G and 5G CBSDes 716, 717) 702 are backhauled by the CMs 125 to the MSO core via 710 includes at least some of the EPC/5GC core functions previously described. Each of the CPEe/FWAe 704 are communicative with their respective CBSDe 702. Client devices 141 such as tablets, smartphones, SmartTVs, etc. at each premises are served by respective WLAN routers 706, the latter which are backhauled to the MSO core or backbone via their respective CPEe/FWAe 704.

Notably, in the embodiment of FIG. 14, all of the necessary components for support of the CPEe/FWAe and B Se functionality described above are owned, maintained and/or operated by the common entity (e.g., cable MSO). The approach of FIG. 14 has the advantage of, inter alia, giving the MSO control over the entire service provider chain, including control over the xNBe devices so as to optimize service to its specific customers (versus the non-MSO customer-specific service provided by an MNO, as discussed below), and the ability to construct its architecture to optimize incipient 5G NR functions such as network slicing, gNB DU/CU Option "splits", etc.

Notwithstanding, in the embodiment of FIG. 14, the architecture 1400 may further include an optional MNO portion (e.g., MNO core 1423 and associated CBSDe or xNBe devices 702, and/or non-enhanced CBSD/xNB devices, which may be operated by the MNO versus the MSO in support of e.g., fixed UE comparable to the CPEe/FWAe within the MSO network, including for subscribers of the MSO or otherwise. For example, other functions such as 3GPP EPC/E-UTRAN or 5GC and NG-RAN functionality can be provided by one or more MNO networks operated by MNOs with which the MSO has a service agreement (and between which data connectivity and network "federation" or cooperation exists, as shown). This approach has the advantage of, inter alia, avoiding more CAPEX by the MSO, including duplication of infrastructure which may already service the area of interest, including reduced RF interference due to addition of extra (and ostensibly unnecessary) CBSDe/xNBe devices or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a computerized premises apparatus, the computerized method comprising:
   causing establishment a connection to a first base station;
   causing establishment of a connection to a second base station;
   receiving a radio network temporary identifier (RNTI) from one of the first base station or the second base station;
   measuring traffic load of user devices in data communication with the computerized premises apparatus;
   based on the traffic load, enabling a dual radio connectivity mode, wherein a service association made by a correlation of the RNTI to a mobile subscriber identity (MSI) of the computerized premises apparatus is required to support the dual radio connectivity mode; and
   based on the enabling of the dual radio connectivity mode, performing one of (i) receiving first downlink (DL) data from the first base station and transmitting first uplink (UP) data to the second base station, or (ii) receiving second DL data from the second base station and transmitting second UL data to the first base station.

2. The computerized method of claim 1, wherein the enabling of the dual radio connectivity mode comprises determining if the traffic load exceeds a predefined threshold.

3. The computerized method of claim 1, wherein the first base station comprises a fourth generation (4G) long-term evolution (LTE) eNodeB, and the second base station comprises a fifth generation (5G) gNodeB.

4. The computerized method of claim 1, wherein the RNTI is used by the one of the first base station or the second base station to identify the computerized premises apparatus in a cell, and the RNTI is used by another one of the first base station or the second base station to effect the correlation of the RNTI to MSI.

5. The computerized method of claim 1, further comprising:
   transmitting data representative of a request to at least one of the first base station or the second base station to enable a split radio connectivity mode; and
   based on the request, enabling the split radio connectivity mode, the split radio connectivity mode enabling a fourth generation (4G) long-term evolution (LTE) air interface and fifth generation (5G) new radio (NR) air interface of the computerized premises apparatus to operate simultaneously with UL and DL data split across the 4G LTE air interface and the 5G NR air interface.

6. The computerized method of claim 5, wherein the enabling of the split radio connectivity mode comprises operating each of 4G LTE air interface and 5G NR air interfaces of the computerized premises apparatus in a time division uniplex (TDU) mode wherein each time slot of a time division structure is allocated to a common traffic transmission or reception direction.

7. The computerized method of claim 5, further comprising characterizing downlink and uplink traffic associated with the computerized premises apparatus;

wherein the enabling of the split radio connectivity mode for the computerized premises apparatus is based at least in part on data generated by the characterizing.

8. The computerized method of claim 7, wherein the characterizing the downlink and uplink traffic associated with the computerized premises apparatus comprises characterizing the downlink and uplink traffic prior to the establishment of one of the connections to the first or second base stations.

9. The computerized method of claim 7, wherein the characterizing the downlink and uplink traffic associated with the computerized premises apparatus comprises characterizing the downlink and uplink traffic after the establishment of both the connections to the first or second base stations.

10. The computerized method of claim 1, wherein:
the first base station and the second base station each comprise a Citizens Broadband Radio Service (CBRS) Citizens Broadband Service Device (CBSD) compliant with Third Generation Partnership Project (3GPP) protocols; and
the computerized premises apparatus comprises a CBRS fixed wireless apparatus (FWA).

11. The computerized method of claim 10, wherein the performing of the at least one of (i) receiving the first DL data from the first base station and transmitting the first UL data to the second base station, or (ii) receiving the second DL data from the second base station and transmitting the second UL data to the first base station comprises receiving or transmitting, respectively, using a CBRS frequency within a band of 3.550 to 3.700 GHz inclusive, the CBRS frequency assigned to the respective CBRS CBSDs by a spectrum allocation system (SAS).

12. The computerized method of claim 10, wherein the CBRS CBSDs are disposed at a common physical location and backhauled by a common modem apparatus operated by a cable multiple systems operator (MSO) to a common 3GPP evolved packet core (EPC).

13. Computer readable apparatus comprising a non-transitory storage medium, the non-transitory storage medium comprising at least one computer program having a plurality of instructions, the plurality of instructions configured to, when executed on a processing apparatus of a fixed wireless receiver of a managed wireless network, cause the fixed wireless receiver to:
evaluate data relating to at least one of traffic type or traffic load associated with the fixed wireless receiver; and
based on the evaluation, enable a dual-connectivity, split radio connectivity mode to receive only downlink (DL) data from a first base station, and transmit only uplink (UL) data to a second base station.

14. The computer readable apparatus of claim 13, wherein the plurality of instructions are further configured to, when executed on the processing apparatus, cause the fixed wireless receiver to:
utilize a time-based data framing protocol, the time-based data framing protocol configured to utilize a plurality of time slots generated or prescribed according to a time division duplex (TDD) protocol, and utilize each of the plurality of time slots at least on a per-frame basis for unidirectional data traffic.

15. The computer readable apparatus of claim 13, wherein the evaluation comprises utilization of a machine learning algorithm.

16. The computer readable apparatus of claim 13, wherein the evaluation comprises a determination of whether the traffic load exceeds a predefined threshold, the split radio connectivity mode configured to be (i) enabled when the traffic load exceeds the predefined threshold, (ii) disabled when the traffic load does not exceed the predefined threshold.

17. A network architecture, the network architecture comprising:
at least two Third Generation Partnership Project (3GPP) compliant Citizens Broadband Service Device (CBSD) devices; and
a plurality of dual-connectivity, split-mode enabled fixed wireless access (FWA) devices each configured (i) for data communication with each of the at least two 3GPP compliant CBSD devices; and (ii) to request split-mode operation, wherein only uplink (UL) traffic is carried on an established connection to a first one of the at least two 3GPP compliant CBSD devices, while only downlink (DL) traffic is carried on a second one of the at least two 3GPP compliant CBSD devices.

18. The network architecture of claim 17, further comprising a spectrum allocation entity configured to issue resource grants to each of the at least two 3GPP compliant CBSD devices.

19. The network architecture of claim 17, wherein each of the plurality of dual-connectivity, split-mode enabled FWA devices comprise first and second wireless interfaces, and each of the first and second wireless interfaces utilize a time division duplex (TDD) protocol for carrying uplink (UL) and downlink (DL) data when a respective one of the plurality of dual-connectivity, split-mode enabled FWA devices is not operating in the split mode of operation, and utilize a modified TDD protocol when the respective one of plurality of dual-connectivity, split-mode enabled FWA devices is operating in the split mode of operation.

20. The network architecture of claim 19, wherein the modified TDD protocol comprises using all or substantially all of a plurality of time slots during each of a plurality of data frames to carry data in a single common direction.

* * * * *